(12) United States Patent
Langvin et al.

(10) Patent No.: US 10,064,448 B2
(45) Date of Patent: Sep. 4, 2018

(54) AUXETIC SOLE WITH UPPER CABLING

(71) Applicant: NIKE, Inc., Beaverton, OR (US)

(72) Inventors: Elizabeth Langvin, Sherwood, OR (US); Tory M. Cross, Portland, OR (US); Bryant Russell Klug, Beaverton, OR (US); Timothy K. Liles, Portland, OR (US); Robert Mervar, Portland, OR (US); Olivier Henrichot, Lake Oswego, OR (US)

(73) Assignee: NIKE, Inc., Beaverton, OR (US)

( * ) Notice: Subject to any disclaimer, the term of this patent is extended or adjusted under 35 U.S.C. 154(b) by 514 days.

(21) Appl. No.: 14/470,067

(22) Filed: Aug. 27, 2014

(65) Prior Publication Data

US 2016/0058121 A1 Mar. 3, 2016

(51) Int. Cl.
| | | |
|---|---|---|
| *A43B 13/00* | (2006.01) | |
| *A43B 13/18* | (2006.01) | |
| *A43B 13/28* | (2006.01) | |
| *A43B 23/02* | (2006.01) | |
| *A43B 5/06* | (2006.01) | |
| *A43B 13/14* | (2006.01) | |
| *B29C 44/34* | (2006.01) | |

(Continued)

(52) U.S. Cl.
CPC .............. *A43B 13/181* (2013.01); *A43B 5/06* (2013.01); *A43B 13/14* (2013.01); *A43B 13/187* (2013.01); *A43B 13/28* (2013.01); *A43B 23/0245* (2013.01); *A43B 23/0265* (2013.01); *B29C 44/357* (2013.01); *A43B 13/18* (2013.01); *B29K 2075/00* (2013.01); *B29K 2223/083* (2013.01); *B29L 2031/504* (2013.01)

(58) Field of Classification Search
CPC ......... A43B 5/06; A43B 13/14; A43B 13/181; A43B 13/187; A43B 13/28; A43B 23/0245; A43B 23/0265; B29C 44/357; B29C 44/56; B29K 2075/00; B29K 2223/083; B29L 2031/504
USPC .................................................. 36/103, 25 R
See application file for complete search history.

(56) References Cited

U.S. PATENT DOCUMENTS

| | | |
|---|---|---|
| 503,062 A | 8/1893 | Norwood |
| 1,733,733 A | 10/1929 | Hess |
| 2,251,468 A | 8/1941 | Smith |

(Continued)

FOREIGN PATENT DOCUMENTS

| | | |
|---|---|---|
| CN | 2870531 Y | 2/2007 |
| CN | 101385584 A | 3/2009 |

(Continued)

OTHER PUBLICATIONS

International Search Report and Written Opinion for Application No. PCT/US2014/052038, dated Dec. 4, 2014.

(Continued)

*Primary Examiner* — Khoa Huynh
*Assistant Examiner* — James Heracklis
(74) *Attorney, Agent, or Firm* — Quinn IP Law

(57) ABSTRACT

An article of footwear has an upper and a sole structure. The upper includes a base layer and one or more tensile strands. The sole structure includes an auxetic element operable to expand in two orthogonal horizontal directions in response to a tension applied in one of the directions. Each tensile strand has at least one end secured in fixed position relative to a peripheral region of the sole structure.

16 Claims, 40 Drawing Sheets

(51) Int. Cl.
*B29L 31/50* (2006.01)
*B29K 75/00* (2006.01)

(56) References Cited

U.S. PATENT DOCUMENTS

| | | | |
|---|---|---|---|
| 2,432,533 A | 12/1947 | Margolin | |
| 2,580,840 A | 1/1952 | Rogndal | |
| 2,963,722 A | 12/1960 | Stix | |
| 3,138,880 A * | 6/1964 | Kunzli | A43B 5/02 |
| | | | 36/105 |
| 3,626,532 A | 12/1971 | Frank | |
| 3,745,600 A | 7/1973 | Rubico et al. | |
| 3,757,436 A | 9/1973 | Winkler et al. | |
| 4,050,108 A | 9/1977 | Londner | |
| 4,272,850 A | 6/1981 | Rule | |
| 4,340,626 A | 7/1982 | Rudy | |
| 4,484,398 A | 11/1984 | Goodwin et al. | |
| 4,668,557 A * | 5/1987 | Lakes | B29C 44/357 |
| | | | 264/321 |
| 4,756,098 A | 7/1988 | Boggia | |
| 4,858,340 A | 8/1989 | Pasternak | |
| 4,899,412 A | 2/1990 | Ganon | |
| 4,967,492 A | 11/1990 | Rosen | |
| 4,999,931 A | 3/1991 | Vermeulen | |
| 5,060,402 A | 10/1991 | Rosen | |
| D339,459 S | 9/1993 | Yoshikawa et al. | |
| D344,170 S | 2/1994 | Acoff | |
| 5,469,639 A | 11/1995 | Sessa | |
| 5,718,064 A | 2/1998 | Pyle | |
| 5,813,146 A | 9/1998 | Gutkowski et al. | |
| 5,918,338 A | 7/1999 | Wong | |
| D420,786 S | 2/2000 | Ramer et al. | |
| 6,052,921 A * | 4/2000 | Oreck | A43C 1/00 |
| | | | 36/50.1 |
| 6,151,804 A | 11/2000 | Hieblinger | |
| 6,178,662 B1 | 1/2001 | Legatzke | |
| 6,226,896 B1 | 5/2001 | Friton | |
| 6,298,582 B1 * | 10/2001 | Friton | A43B 5/06 |
| | | | 36/102 |
| 6,357,146 B1 | 3/2002 | Wordsworth et al. | |
| 6,412,593 B1 | 7/2002 | Jones | |
| 6,487,795 B1 | 12/2002 | Ellis, III | |
| 6,564,476 B1 | 5/2003 | Hernandez | |
| D487,614 S | 3/2004 | Le et al. | |
| D488,916 S * | 4/2004 | McClaskie | D2/957 |
| 6,763,611 B1 * | 7/2004 | Fusco | A43B 13/125 |
| | | | 36/25 R |
| 6,862,820 B2 | 3/2005 | Farys et al. | |
| 7,132,032 B2 | 11/2006 | Tawney et al. | |
| 7,160,621 B2 | 1/2007 | Chaudhari et al. | |
| 7,252,870 B2 * | 8/2007 | Anderson | B31F 1/07 |
| | | | 428/152 |
| 7,254,906 B2 | 8/2007 | Morris et al. | |
| 7,310,894 B1 | 12/2007 | Schwarzman et al. | |
| D571,543 S | 6/2008 | Sungadi et al. | |
| 7,455,567 B2 | 11/2008 | Bentham et al. | |
| 7,487,602 B2 | 2/2009 | Berger et al. | |
| 7,546,698 B2 | 6/2009 | Meschter | |
| 7,574,818 B2 | 8/2009 | Meschter | |
| D614,382 S | 4/2010 | Grenet et al. | |
| 7,770,307 B2 | 8/2010 | Meschter | |
| 7,814,852 B2 | 10/2010 | Meschter | |
| 7,827,703 B2 | 11/2010 | Geer et al. | |
| 7,870,681 B2 | 1/2011 | Meschter | |
| 7,870,682 B2 | 1/2011 | Meschter et al. | |
| 8,002,879 B2 | 8/2011 | Hook | |
| D653,844 S | 2/2012 | Smith et al. | |
| 8,122,616 B2 | 2/2012 | Meschter et al. | |
| 8,132,340 B2 | 3/2012 | Meschter | |
| 8,186,078 B2 | 5/2012 | Avar et al. | |
| 8,196,316 B2 | 6/2012 | Cook et al. | |
| 8,220,072 B2 | 7/2012 | Dodd | |
| 8,225,530 B2 | 7/2012 | Sokolowski et al. | |
| 8,266,827 B2 * | 9/2012 | Dojan | A43B 23/025 |
| | | | 36/45 |
| 8,276,294 B2 | 10/2012 | Polegato | |
| 8,277,719 B2 * | 10/2012 | Alderson | B29C 44/357 |
| | | | 264/321 |
| 8,312,645 B2 * | 11/2012 | Dojan | A43B 3/26 |
| | | | 36/45 |
| 8,322,050 B2 * | 12/2012 | Lubart | A43B 13/223 |
| | | | 36/59 C |
| 8,343,404 B2 | 1/2013 | Meli et al. | |
| 8,388,791 B2 | 3/2013 | Dojan et al. | |
| 8,490,299 B2 | 7/2013 | Dua et al. | |
| 8,516,723 B2 | 8/2013 | Ferrigan et al. | |
| 8,544,197 B2 | 10/2013 | Spanks et al. | |
| 8,631,589 B2 | 1/2014 | Dojan | |
| 8,652,602 B1 * | 2/2014 | Dolla | B29C 44/357 |
| | | | 428/36.1 |
| 8,661,564 B2 | 3/2014 | Dodd | |
| 8,732,982 B2 | 5/2014 | Sullivan et al. | |
| D707,934 S | 7/2014 | Petrie et al. | |
| D716,027 S * | 10/2014 | Kirschner | D2/951 |
| D717,034 S | 11/2014 | Bramani et al. | |
| 8,961,733 B2 | 2/2015 | Dodd | |
| 9,192,204 B1 * | 11/2015 | Liles | A43C 1/04 |
| 9,554,620 B2 * | 1/2017 | Cross | B32B 27/065 |
| 9,554,622 B2 * | 1/2017 | Cross | A43B 13/14 |
| 9,554,624 B2 * | 1/2017 | Cross | A43B 13/22 |
| 9,635,903 B2 * | 5/2017 | Lawless | A43B 3/0073 |
| 9,668,542 B2 * | 6/2017 | Lawless | A43B 13/141 |
| 2002/0166262 A1 | 11/2002 | Hernandez | |
| 2004/0181972 A1 | 9/2004 | Csorba | |
| 2007/0213838 A1 | 9/2007 | Hengelmolen | |
| 2007/0240333 A1 | 10/2007 | Le et al. | |
| 2008/0011021 A1 | 1/2008 | Starbuck et al. | |
| 2008/0216357 A1 | 9/2008 | Fogg et al. | |
| 2008/0250673 A1 | 10/2008 | Andrews et al. | |
| 2008/0289214 A1 | 11/2008 | Aveni | |
| 2009/0064536 A1 | 3/2009 | Klassen et al. | |
| 2009/0064540 A1 | 3/2009 | Sokolowski et al. | |
| 2009/0119820 A1 | 5/2009 | Bentham et al. | |
| 2009/0151195 A1 | 6/2009 | Forstrom et al. | |
| 2009/0178301 A1 | 7/2009 | Dojan et al. | |
| 2009/0183392 A1 | 7/2009 | Shane | |
| 2009/0276933 A1 | 11/2009 | Dodd | |
| 2009/0307932 A1 | 12/2009 | Kirby et al. | |
| 2010/0029796 A1 | 2/2010 | Alderson et al. | |
| 2010/0037483 A1 * | 2/2010 | Meschter | A43B 3/26 |
| | | | 36/47 |
| 2010/0043253 A1 * | 2/2010 | Dojan | A43B 1/0072 |
| | | | 36/47 |
| 2010/0043255 A1 | 2/2010 | Trevino | |
| 2010/0095551 A1 | 4/2010 | Gupta et al. | |
| 2010/0126041 A1 | 5/2010 | Francis | |
| 2010/0139122 A1 | 6/2010 | Zanatta | |
| 2010/0146818 A1 * | 6/2010 | Sokolowski | A43B 5/12 |
| | | | 36/102 |
| 2010/0170117 A1 | 7/2010 | Kim | |
| 2010/0236098 A1 | 9/2010 | Morgan | |
| 2010/0251564 A1 * | 10/2010 | Meschter | A43B 23/0225 |
| | | | 36/28 |
| 2011/0099845 A1 | 5/2011 | Miller | |
| 2011/0109005 A1 * | 5/2011 | Bianchi | B29C 44/357 |
| | | | 264/51 |
| 2011/0119956 A1 | 5/2011 | Borel et al. | |
| 2011/0168313 A1 | 7/2011 | Ma et al. | |
| 2011/0192056 A1 | 8/2011 | Geser et al. | |
| 2011/0192059 A1 * | 8/2011 | Spanks | A43B 1/0072 |
| | | | 36/137 |
| 2011/0197475 A1 * | 8/2011 | Weidl | A43B 1/0009 |
| | | | 36/107 |
| 2011/0232130 A1 * | 9/2011 | Boudreau | A43B 13/141 |
| | | | 36/88 |
| 2011/0247237 A1 | 10/2011 | Jara et al. | |
| 2011/0247240 A1 | 10/2011 | Eder et al. | |
| 2012/0021167 A1 * | 1/2012 | Plant | A41D 13/0156 |
| | | | 428/116 |
| 2012/0023686 A1 | 2/2012 | Huffa et al. | |
| 2012/0023786 A1 * | 2/2012 | Dojan | A43B 23/0275 |
| | | | 36/25 R |

(56) References Cited

U.S. PATENT DOCUMENTS

| | | | |
|---|---|---|---|
| 2012/0055044 A1* | 3/2012 | Dojan | A43B 1/0027 36/87 |
| 2012/0117826 A1 | 5/2012 | Jarvis | |
| 2012/0124861 A1 | 5/2012 | Losani | |
| 2012/0124865 A1 | 5/2012 | Opie et al. | |
| 2012/0129416 A1* | 5/2012 | Anand | D04B 21/18 442/306 |
| 2012/0159810 A1 | 6/2012 | Klassen | |
| 2012/0167416 A1* | 7/2012 | Christensen | A43B 3/0057 36/103 |
| 2012/0174432 A1 | 7/2012 | Peyton | |
| 2012/0181896 A1 | 7/2012 | Kornbluh et al. | |
| 2012/0198720 A1 | 8/2012 | Farris et al. | |
| 2012/0210607 A1 | 8/2012 | Avar et al. | |
| 2012/0233878 A1 | 9/2012 | Hazenberg et al. | |
| 2012/0234051 A1 | 9/2012 | Huffa | |
| 2012/0266492 A1 | 10/2012 | Youngs et al. | |
| 2012/0272550 A1 | 11/2012 | Parce | |
| 2012/0315456 A1 | 12/2012 | Scarpa et al. | |
| 2013/0000152 A1 | 1/2013 | Cooper et al. | |
| 2013/0071583 A1 | 3/2013 | Evans et al. | |
| 2013/0081305 A1 | 4/2013 | Byrne | |
| 2013/0104428 A1 | 5/2013 | O'Brien et al. | |
| 2013/0160324 A1 | 6/2013 | Peyton et al. | |
| 2013/0160328 A1 | 6/2013 | Hatfield et al. | |
| 2013/0219636 A1* | 8/2013 | Dojan | A43B 23/0235 12/142 R |
| 2013/0239444 A1 | 9/2013 | Polegato | |
| 2013/0276333 A1 | 10/2013 | Wawrousek et al. | |
| 2013/0284732 A1 | 10/2013 | Van | |
| 2013/0318837 A1* | 12/2013 | Dua | A43B 1/04 36/9 R |
| 2013/0340288 A1 | 12/2013 | Baker et al. | |
| 2014/0053311 A1* | 2/2014 | Nordstrom | A41D 1/00 2/69 |
| 2014/0053312 A1 | 2/2014 | Nordstrom et al. | |
| 2014/0059734 A1 | 3/2014 | Toronjo | |
| 2014/0090271 A1 | 4/2014 | Hoffer et al. | |
| 2014/0101816 A1* | 4/2014 | Toronjo | A41D 31/0011 2/69 |
| 2014/0157631 A1 | 6/2014 | Dodd | |
| 2014/0165427 A1 | 6/2014 | Molyneux et al. | |
| 2014/0173938 A1 | 6/2014 | Beye et al. | |
| 2014/0237850 A1 | 8/2014 | Hull | |
| 2014/0237861 A1* | 8/2014 | Podhajny | D04B 1/123 36/9 R |
| 2014/0260281 A1* | 9/2014 | Innes | F23R 3/002 60/752 |
| 2015/0075033 A1* | 3/2015 | Cross | A43B 13/22 36/103 |
| 2015/0075034 A1 | 3/2015 | Cross et al. | |
| 2015/0230548 A1* | 8/2015 | Cross | A43B 13/187 36/104 |
| 2015/0237957 A1* | 8/2015 | Cross | A43B 13/14 36/30 R |
| 2015/0237958 A1* | 8/2015 | Cross | A43B 13/181 36/103 |
| 2015/0245683 A1* | 9/2015 | Cross | B32B 27/065 36/103 |
| 2015/0245685 A1* | 9/2015 | Cross | A43B 13/187 36/104 |
| 2015/0245686 A1* | 9/2015 | Cross | A43B 13/02 36/29 |
| 2016/0007681 A1* | 1/2016 | Langvin | A43B 5/00 36/103 |
| 2016/0058121 A1* | 3/2016 | Langvin | A43B 5/06 36/103 |
| 2016/0095385 A1* | 4/2016 | Nordstrom | A43B 13/181 36/29 |
| 2016/0157553 A1* | 6/2016 | Cross | A43B 13/023 36/30 R |
| 2016/0157557 A1* | 6/2016 | Cross | A43B 13/223 36/25 R |
| 2016/0157558 A1* | 6/2016 | Cross | A43B 13/14 36/25 R |
| 2016/0219975 A1* | 8/2016 | Wright | A43B 13/14 |
| 2016/0262491 A1* | 9/2016 | Cross | A43B 13/14 |
| 2016/0302530 A1* | 10/2016 | Smith | A43C 11/004 |

FOREIGN PATENT DOCUMENTS

| | | | |
|---|---|---|---|
| CN | 101677651 A | 3/2010 | |
| EP | 2702884 A1 * | 3/2014 | A41D 31/0016 |
| GB | 2147792 A | 5/1985 | |
| GB | 2455167 A | 6/2009 | |
| GB | 2463446 A | 3/2010 | |
| JP | 2005143637 A | 6/2005 | |
| KR | 101165793 B1 | 7/2012 | |
| TW | 201231283 A | 8/2012 | |
| WO | 03/022085 A2 | 3/2003 | |
| WO | 2007022338 A1 | 2/2007 | |
| WO | 2007052054 A1 | 5/2007 | |
| WO | WO 2009049116 A1 * | 4/2009 | B29C 47/30 |
| WO | 2012171911 A1 | 12/2012 | |
| WO | WO 2013126474 A1 * | 8/2013 | A43B 23/0265 |
| WO | 2014187970 | 11/2014 | |
| WO | 2015041796 | 3/2015 | |
| WO | 2016007205 A1 | 1/2016 | |
| WO | 2016032626 A1 | 3/2016 | |

OTHER PUBLICATIONS

International Search Report and Written Opinion dated Oct. 14, 2015 in PCT/US2015/038958.
International Search Report and Written Opinion dated Apr. 6, 2016 in PCT Application No. PCTUS2015/066883.
International Search Report and Written Opinion dated Apr. 6, 2016 in PCT Application No. PCTUS2015/066923.
International Search Report and Written Opinion dated Apr. 13, 2016 in PCT Application No. PCTUS2015/066895.
Taiwanese Office Action dated Mar. 1, 2016 in Taiwanese Patent Application No. 103131046.
International Search Report and Written Opinion dated Nov. 17, 2015 in PCT/US2015/040523.
International Search Report and Written Opinion dated Mar. 18, 2016 in PCT Application No. PCTUS2015/066901.
International Search Report and Written Opinion dated Mar. 18, 2016 in PCT Application No. PCTUS2015/066913.
International Preliminary Report on Patentability (including Written Opinion of the ISA) dated Mar. 22, 2016 in PCT Application No. PCTUS2014/052038.
International Search Report and Written Opinion dated Mar. 18, 2016 in PCT Application No. PCTUS2015/066905.
Non-Final Office Action dated Mar. 26, 2015 for U.S. Appl. No. 14/030,002, filed Sep. 18, 2013.

* cited by examiner

AUXETIC SOLE WITH UPPER CABLING

BACKGROUND

Articles of footwear generally include two primary elements: an upper and a sole structure. The upper is often formed from a plurality of material elements (e.g., textiles, polymer sheet layers, foam layers, leather, synthetic leather) that are stitched or adhesively bonded together to form a void on the interior of the footwear for comfortably and securely receiving a foot. More particularly, the upper forms a structure that extends over instep and toe areas of the foot, along medial and lateral sides of the foot, and around a heel area of the foot. This plurality of material elements may form a base layer of the upper. The upper may also incorporate a lacing system to adjust fit of the footwear, as well as permitting entry and removal of the foot from the void within the upper. In addition, the upper may include a tongue that extends under the lacing system to enhance adjustability and comfort of the footwear, and the upper may incorporate a heel counter.

The various material elements forming the upper impart different properties to different areas of the upper. For example, textile elements may provide breathability and may absorb moisture from the foot, foam layers may compress to impart comfort, and leather may impart durability and wear-resistance. As the number of material elements increases, the overall mass of the footwear may increase proportionally. The time and expense associated with transporting, stocking, cutting, and joining the material elements may also increase. Additionally, waste material from cutting and stitching processes may accumulate to a greater degree as the number of material elements incorporated into an upper increases. Moreover, products with a greater number of material elements may be more difficult to recycle than products formed from fewer material elements. By decreasing the number of material elements, therefore, the mass of the footwear and waste may be decreased, while increasing manufacturing efficiency and recyclability.

The sole structure is secured to a lower portion of the upper so as to be positioned between the foot and the ground. In athletic footwear, for example, the sole structure often includes a midsole and an outsole. The midsole may be formed from a polymer foam material that attenuates ground reaction forces (i.e., provides cushioning) during walking, running, and other ambulatory activities. The midsole may also include fluid-filled chambers, plates, moderators, or other elements that further attenuate forces, enhance stability, or influence the motions of the foot, for example. The outsole forms a ground-contacting element of the footwear and is usually fashioned from a durable and wear-resistant rubber material that includes texturing to impart traction. The sole structure may also include a sockliner positioned within the upper and proximal a lower surface of the foot to enhance footwear comfort.

SUMMARY

Within the sole structure of an article of footwear, the midsole, or the outsole, or both may be formed to have an auxetic structure. Auxetic elements incorporated within sole structures may permit the footwear to dynamically adjust its fit upon a wearer's foot in response to specific forces placed upon it, such as forces due to walking, running, athletic activity, or other typical uses of the footwear. In addition, one or more tensile strands separate from the material or materials of the base layer may be incorporated into the upper. In an article incorporating an auxetic element in its sole structure, the additional incorporation of tensile strands in the upper of the footwear may advantageously permit localized tuning of the dynamic adjustment of fit imparted by the auxetic element.

In one aspect, an article of footwear includes an upper and a sole structure. The upper comprises a base layer and a tensile strand, the tensile strand having a first end and a second end. A portion of the tensile strand between the first end and the second end is separate from the material of the base layer and lies adjacent to a surface of the base layer. The sole structure comprises an auxetic element with a plurality of apertures extending therethrough. The first end of the tensile strand has a fixed position relative to a peripheral region of the auxetic element.

In another aspect, an article of footwear includes a sole structure, a base layer, and a tensile strand. The sole structure includes an auxetic sole portion oriented along a plane. The plane extends in a first direction between a heel region and a forefoot region of the article of footwear, and extends in a second direction between a medial side and a lateral side of the article of footwear. The auxetic sole portion has a plurality of apertures operable to change shape in response to either a tension or a compression applied to the auxetic sole portion along the plane. The base layer is secured to a peripheral region of the sole structure. The tensile strand is separate from the material of the base layer and has at least one end fixed in position relative to a peripheral region of the base layer.

In another aspect, an article of footwear includes a base layer, an auxetic sole element, and a plurality of tensile strands. The auxetic sole element extends along both a first direction and an orthogonal second direction of a plane, and comprises a plurality of first portions joined to each other by a plurality of second portions. Each of the plurality of tensile strands lies adjacent to a surface of the base layer, and at least one end of each of the plurality of tensile strands has a fixed position relative to a peripheral region of the auxetic sole element. A tension applied to the auxetic sole element in either the first direction or the second direction induces the first portions to rotate relative to one another and induces the auxetic sole element to expand in both the first direction and the second direction.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

The following discussion and accompanying figures disclose articles of footwear having uppers that include tensile strands and sole structures that include auxetic elements. The article of footwear is disclosed as having a general configuration suitable for walking or running. Concepts associated with the footwear, including the upper, may also be applied to a variety of other athletic footwear types, including baseball shoes, basketball shoes, cross-training shoes, cycling shoes, football shoes, tennis shoes, soccer shoes, and hiking boots, for example. The concepts may also be applied to footwear types that are generally considered to be non-athletic, including dress shoes, loafers, sandals, and work boots. The concepts disclosed herein apply, therefore, to a wide variety of footwear types.

General Footwear Structure

Figure 1:
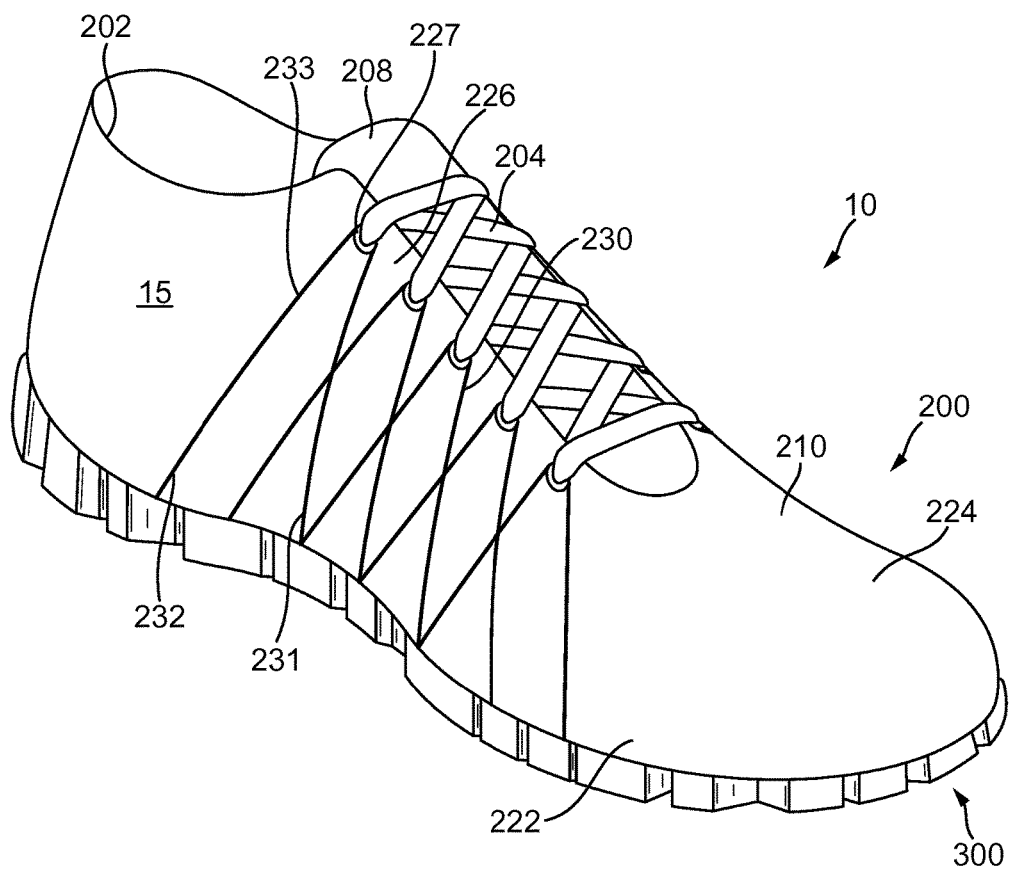
FIG. 1 is a lateral side perspective view of an embodiment of an article of footwear.
Figure 2:
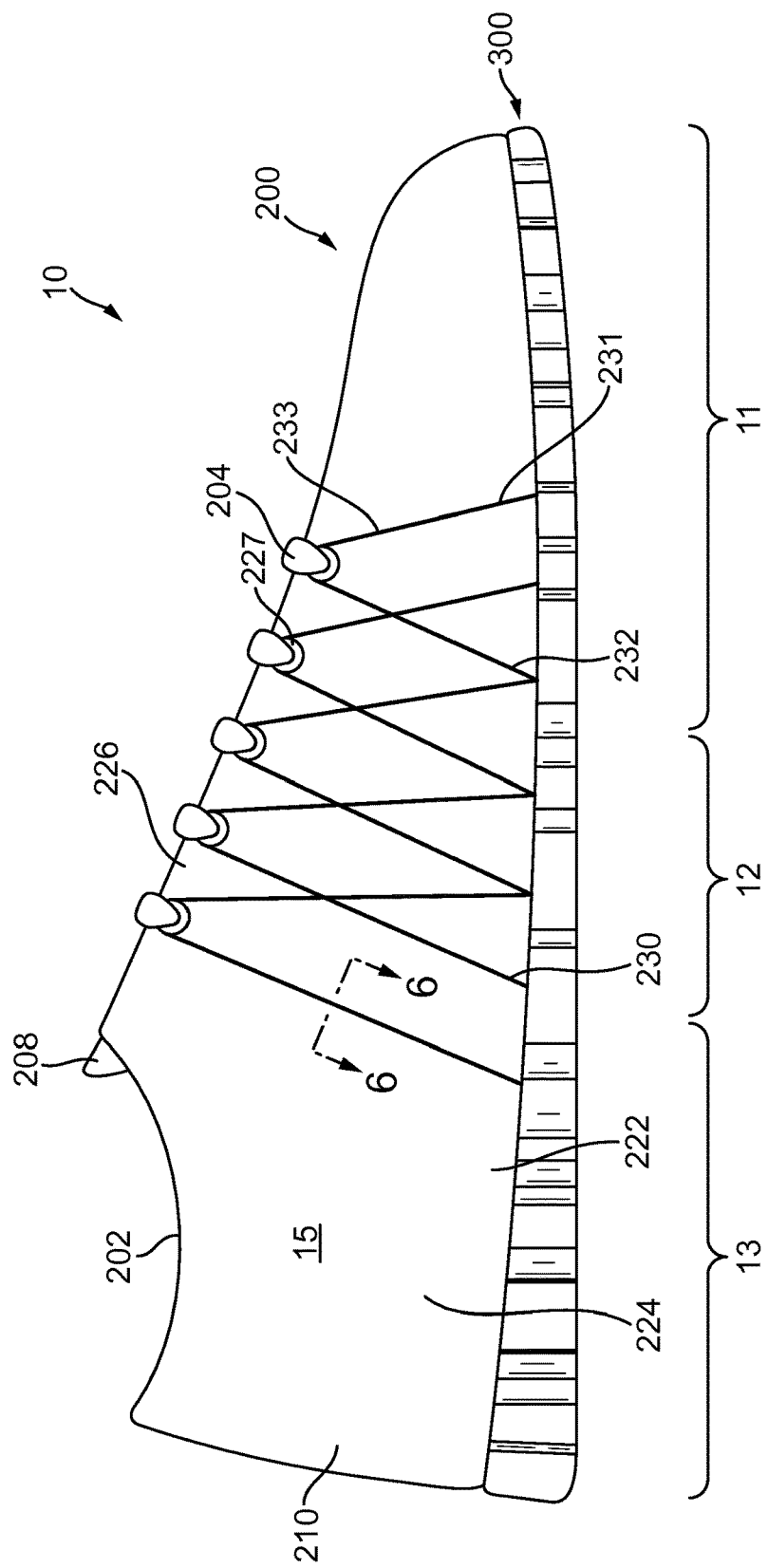
FIG. 2 is a lateral side elevational view of the article of footwear.
Figure 3:
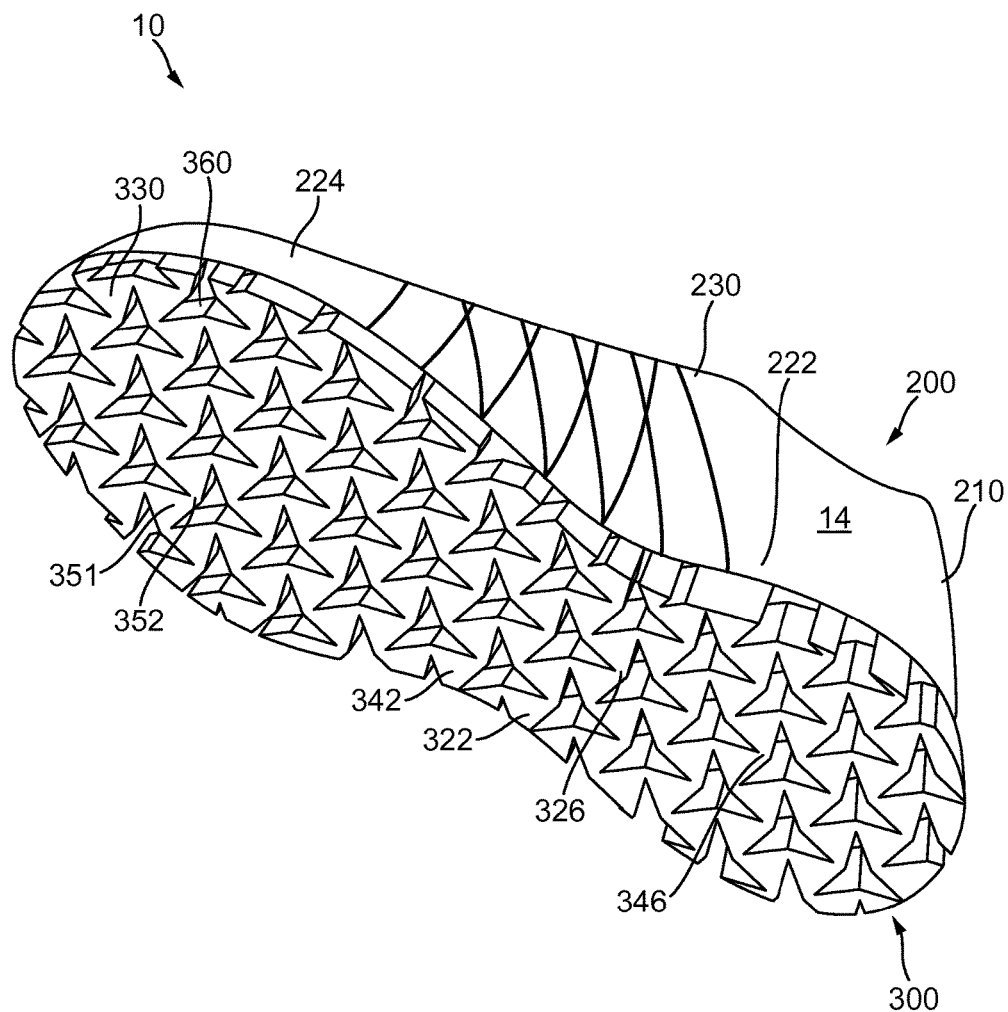
FIG. 3 is a medial side bottom perspective view of the article of footwear.
Figure 4:
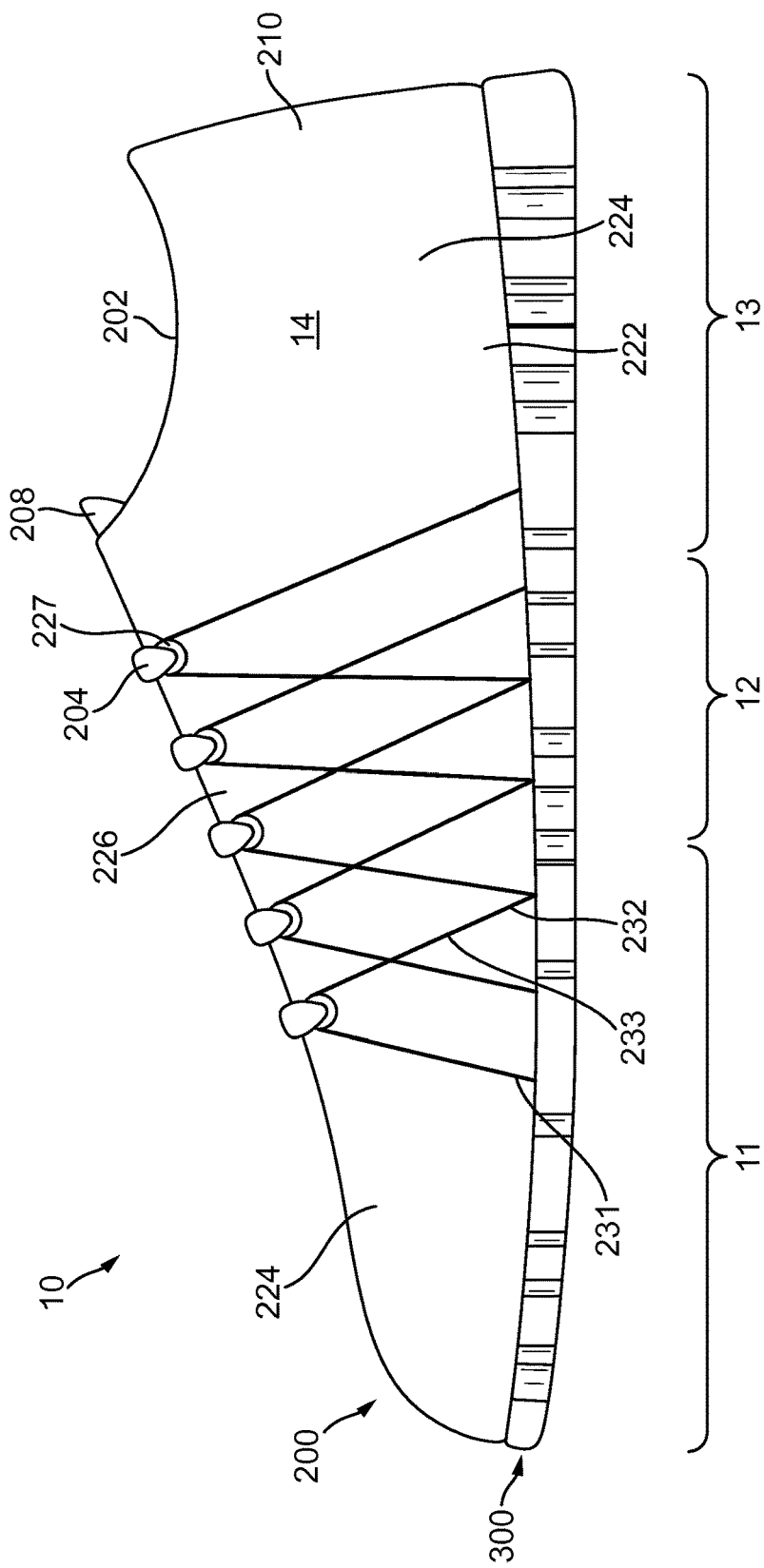
FIG. 4 is a medial side elevational view of the article of footwear.

An article of footwear 10 is depicted in FIGS. 1-8 as including an upper 200 and a sole structure 300. For reference purposes, footwear 10 may be divided into three general regions: a forefoot region 11, a midfoot region 12, and a heel region 13, as shown in FIGS. 2 and 4. Forefoot region 11 generally includes portions of footwear 10 corresponding with the toes and the joints connecting the metatarsals with the phalanges. Midfoot region 12 generally includes portions of footwear 10 corresponding with the arch area of the foot. Heel region 13 generally includes portions of footwear 10 corresponding with rear portions of the foot, including the calcaneus bone.

Footwear 10 also includes a medial side 14 and a lateral side 15. Medial side 14 and lateral side 15 and extend through each of forefoot region 11, midfoot region 12, and heel region 13 and correspond with opposite sides of footwear 10.

Forefoot region 11, midfoot region 12, heel region 13, medial side 14, and lateral side 15 are not intended to demarcate precise areas of footwear 10. Rather, they are intended to represent general areas of footwear 10 to aid in the following discussion. In addition to being applied to footwear 10, forefoot region 11, midfoot region 12, heel region 13, medial side 14, and lateral side 15 may also be applied to upper 200, sole structure 300, and individual elements thereof.

The primary elements of upper 200 are a base layer 210 and a plurality of tensile strands 230. A variety of material elements or other components may be incorporated into base layer 210. Base layer 210 may be formed from one or more of a plurality of material elements (e.g., textiles, polymer sheets, foam layers, leather, synthetic leather) that are stitched or bonded together to form a void within footwear 10 for receiving and securing a foot of a wearer relative to sole structure 300. The void is shaped to accommodate the foot and extends along the lateral side of the foot, along the medial side of the foot, over the foot, around the heel, and under the foot.

Access to the void is provided by an ankle opening 202 located in at least heel region 13. A lace 204 extends through various lace apertures 227 in base layer 210 and permits the wearer to modify dimensions of upper 200 to accommodate the proportions of the foot. More particularly, lace 204 permits the wearer to tighten upper 200 around the foot, and lace 204 permits the wearer to loosen upper 200 to facilitate entry and removal of the foot from the void (i.e., through ankle opening 202). In addition, upper 200 includes a tongue 208 that extends between the interior void and lace 204 to enhance the comfort of footwear 10.

As an alternative to lace apertures 207, upper 200 may include other lace-receiving elements, such as loops, eyelets, and D-rings. In some configurations, upper 200 may incorporate a heel counter that limits heel movement in heel region 13 or a wear-resistant toe guard located in forefoot region 11.

Both medial side 14 and lateral side 15 and of upper 200 are depicted as incorporating various tensile strands 230 having first ends 231, second ends 232, and middle portions 233 extending between first ends 231 and second ends 232. Although depicted as including five tensile strands 230 on each of medial side 14 and lateral side 15 of upper 200, each of medial side 14 and lateral side 15 may include any number of tensile strands 230. In some configurations, either medial side 14 or lateral side 15 may not include any tensile strands 230. The number of tensile strands 230 incorporated into footwear 10 may accordingly vary significantly.

In some embodiments, tensile strands may have at least a minimal length thereby ensuring that the tensile strands provide support between (or through) two or more distinct regions of an article. As depicted, middle portions 233 of tensile strands 230 have lengths of at least 3 cm, and tensile strands 230 accordingly extend over distances of at least 3 cm. In various configurations of footwear 10, middle portions 233 may have lengths of at least 5 cm or at least 10 cm, and tensile strands 230 may extend over distances of at least 5 cm or at least 10 cm, respectively. Although first ends 231 and second ends 232 are depicted as being positioned at different locations spaced from each other by a distance of between 1 cm and 5 cm, first ends 231 and second ends 232 of at least some of tensile strands 230 may be spaced from each other by distances less than 1 cm, or distances greater than 5 cm.

The material of tensile strands 230 is separate from the material of base layer 210. Moreover, while tensile strands 230 are secured to footwear 10 at first ends 231 and second ends 232, and while middle portions 233 lie adjacent to an outer surface 211 of base layer 210, part or all of middle portions 233 may be unattached to or unbonded to base layer 210 in some configurations of footwear 10. That is, part or all of middle portions 233 may be unsecured to base layer 210 and may accordingly be free to move relative to base layer 210.

Tensile strands 230 of footwear 10 generally extend between a central region or lace aperture region 226 of base layer 210 (i.e., the region where lace apertures 227 or other lace-receiving elements are located) and a peripheral region 222 of the base layer (i.e., the region at which upper 200 joins with sole structure 300). More particularly, tensile strands 230 extend from lace aperture region 226 to peripheral region 222 of base layer 210, or to peripheral region 322 of sole structure 300, or both. Base layer 210 may additionally have a middle region 224 extending between peripheral region 222 and lace aperture region 226.

For example, FIGS. 1-4 show each of tensile strands 230 as extending between peripheral region 322 of sole structure 300 and an area proximal to a lace aperture 227 in lace aperture region 226. First ends 231 and second ends 232 of tensile strands 230 are secured in fixed positions relative to peripheral region 322 of sole structure 300, and middle portions 233 of tensile strands 230 extend around lace apertures 227.

In some configurations of footwear 10, at least some of first ends 231 and second ends 232 may be secured directly to peripheral region 322 of sole structure 300, such as by being adhesively bonded or physically coupled to peripheral region 322. In other configurations of footwear 10, at least some of first ends 231 and second ends 232 may be secured indirectly to peripheral region 322 of sole structure 300. For example, first ends 231 and second ends 232 may be secured directly to peripheral region 222 of base layer 210, and peripheral region 222 may in turn be directly secured to peripheral region 322 of sole structure 300. In such configurations, although not directly secured to peripheral region 322 of sole structure 300, first ends 231 and second ends 232 may still be secured to have a fixed position relative to peripheral region 322. In still further configurations, at least some of first ends 231 and second ends 232 may be bonded to or otherwise secured to both peripheral region 222 of base layer 210 and peripheral region 322 of sole structure 300. In various configurations, first ends 231 and second ends 232 may be either secured either directly or indirectly to peripheral region 222, or peripheral region 322, or both, and may thus be fixed in position relative to either peripheral region 222, or peripheral region 322, or both.

Figure 5:
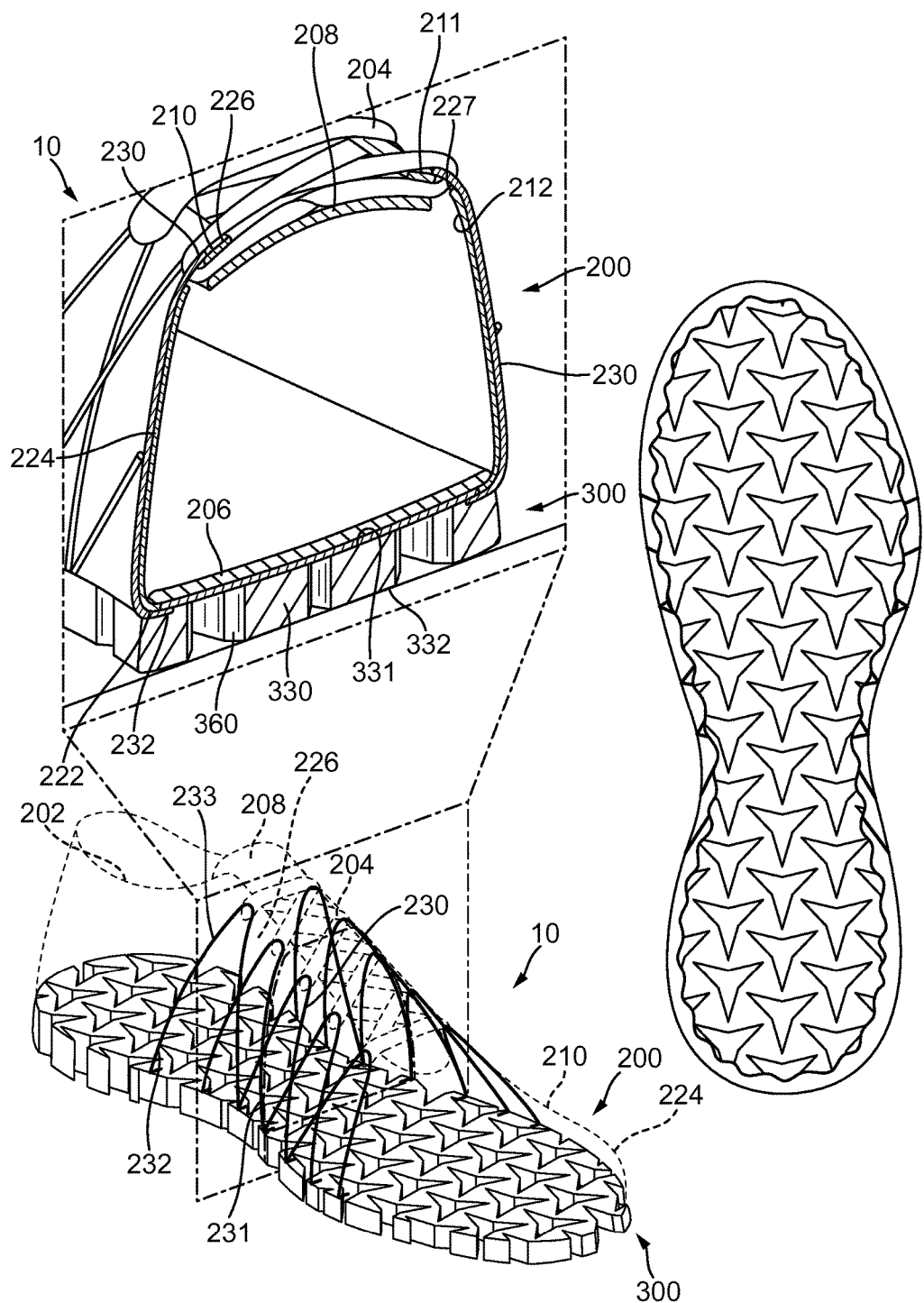
FIG. 5 is a lateral side perspective view, an enlarged cut-away view, and a top cut-away view of the article of footwear.
Figure 6:
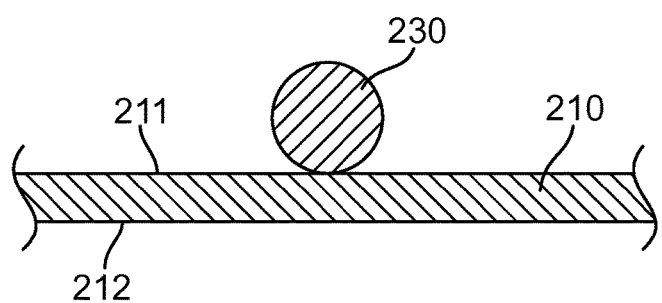
FIG. 6 is a cross-sectional view of the article of footwear, as defined by section line 6-6 in FIG. 2.
Figure 7:
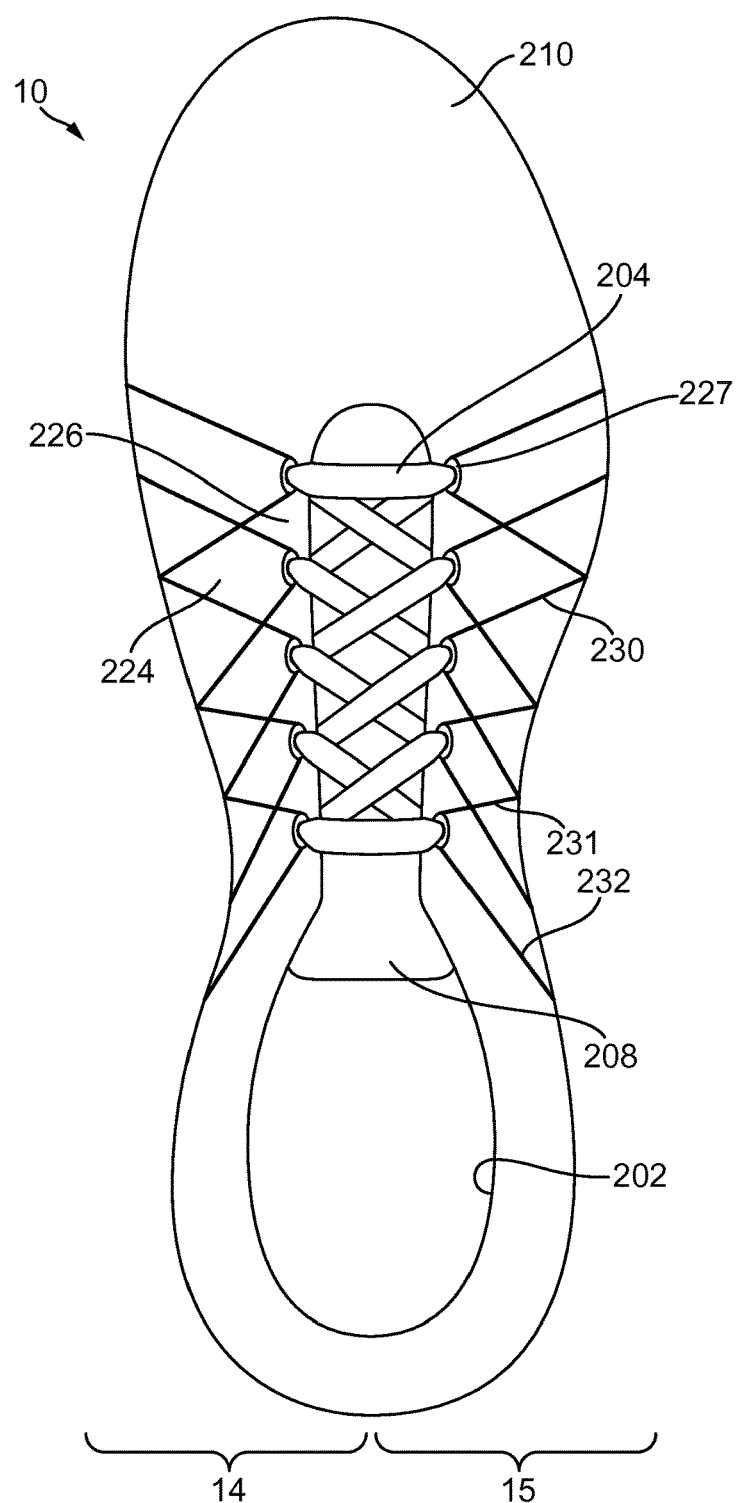
FIG. 7 is a top plan view of the article of footwear.
Figure 8:
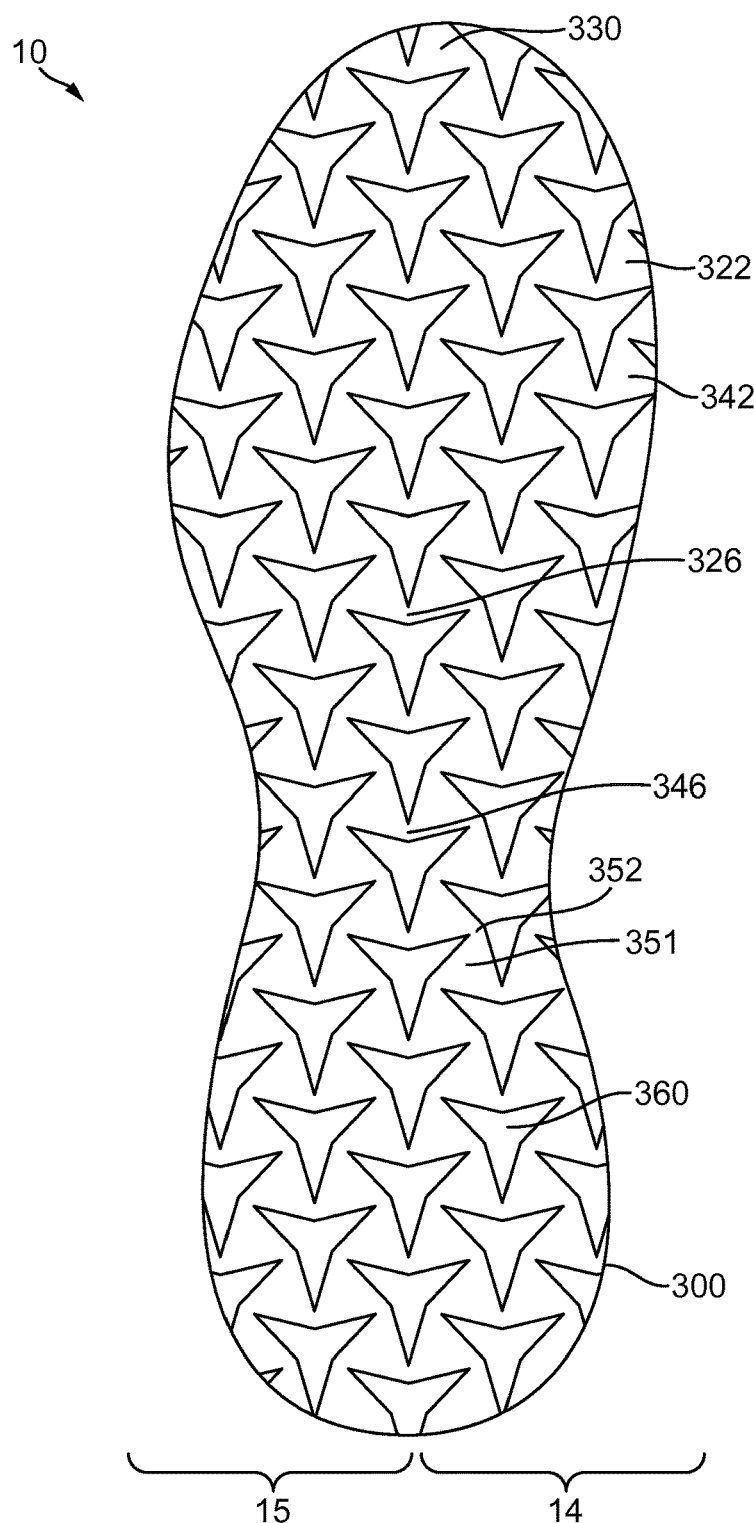
FIG. 8 is a bottom plan view of the article of footwear.

Peripheral region 222 of upper 200 is depicted in FIG. 5 as being secured to peripheral region 322 of sole structure 300. The primary elements of sole structure 300 are a sockliner 206 and an auxetic element 330. Sockliner 206 is located within upper 200 and is positioned to extend under a lower surface of the foot. Auxetic element 330 extends between the foot and the ground when footwear 10 is worn, and is depicted as forming a ground-contacting surface of footwear 10. Accordingly, in some embodiments, auxetic element 330 may form an outsole element of footwear 10.

As best shown in FIGS. 3 and 5, auxetic element 330 has a first surface 331, which is secured to a lower part of outer surface 211 of upper 200, and a second surface 332 which forms a ground-contacting surface of footwear 10. First surface 331 may accordingly be an upper surface of auxetic element 330, while second surface 332 may be a lower surface of auxetic element 330. A peripheral region 342 of auxetic element 330 extends to a peripheral region 322 of sole structure 300, while a central region 346 of auxetic element 330 is positioned at a central region 326 of sole structure 300. Put another way, auxetic element 330 is depicted in FIGS. 1-8 as spanning an entirety of a horizontal extent of sole structure 300, from forefoot region 11 to heel region 13, and from medial side 14 to lateral side 15.

Across this span, auxetic element 330 has a plurality of first portions 351, a plurality of second portions 352 joining first portions 351, and apertures 360 surrounded by first portions 351 and second portions 352. Apertures 360 extend from first surface 331 to second surface 332, and completely through auxetic element 330 in a vertical direction. First portions 351, second portions 352, and apertures 360 advantageously provide auxetic element 330 with an auxetic structure.

Auxetic Element and Auxetic Structure

As used herein, the term "auxetic structure" generally refers to a structure that, when it is placed under tension in a first direction, increases its dimensions in a direction that is orthogonal to the first direction. Such auxetic structures may be characterized as having a negative Poisson's ratio. Although such structures will generally have at least a monotonic relationship between the applied tension and the increase in the dimension orthogonal to the direction of the tension, that relationship need not be proportional or linear, and in general need only increase in response to increased tension.

Figure 9:
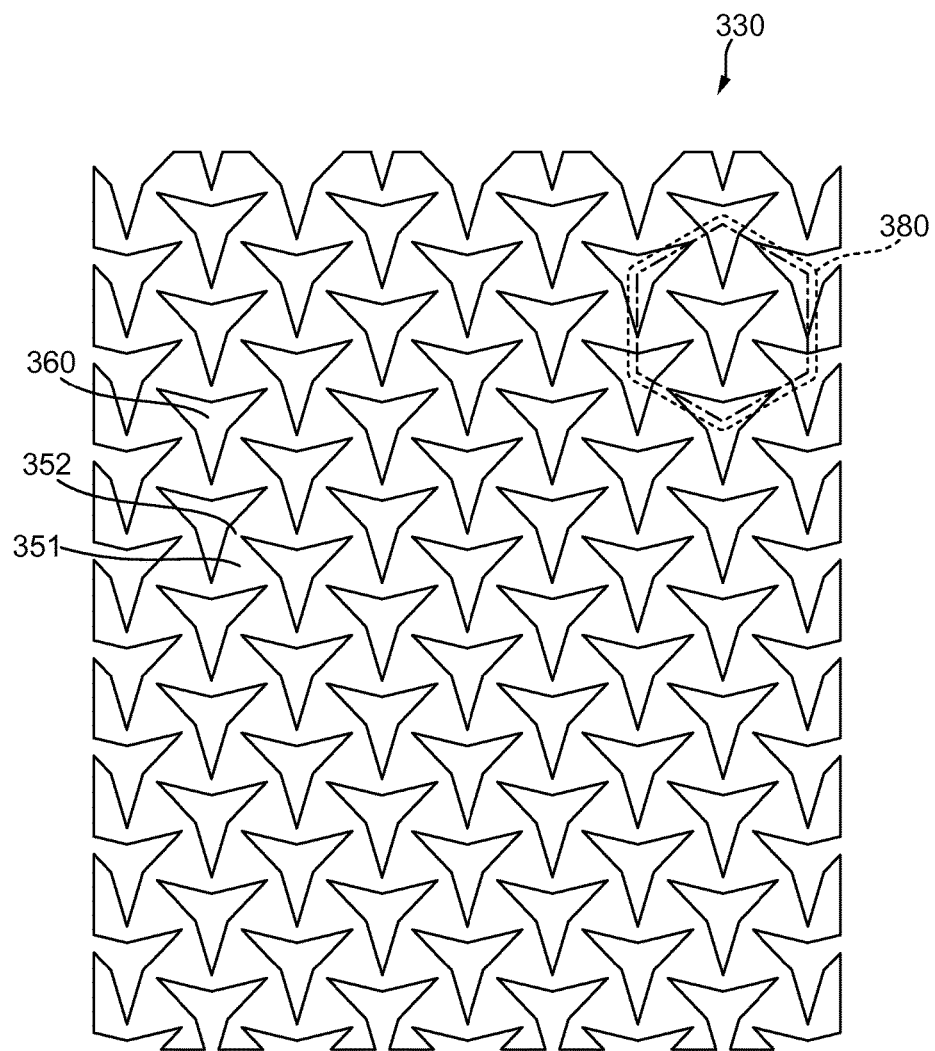
FIG. 9 is a plan view of an alternate embodiment of an auxetic element.

FIG. 9 depicts an alternate configuration of auxetic element 330, separate from footwear 10. The structural features of auxetic element 330 include: first portions 351 of the material of auxetic element 330, which have polygonal shapes, or more specifically triangular shapes; second portions 352 of the material of auxetic element 330, which join adjacent first portions 351; and apertures 360 between first portions 351 and second portions 352, which have polygonal shapes, or more specifically shapes of re-entrant triangles, or three-pointed stars.

First portions 351, second portions 352, and apertures 360 are arranged in a regular geometric pattern. More specifically, first portions 351, second portions 352, and apertures 360 are arranged in a regular hexagonal tessellation. As a result, the pattern of the structure of auxetic element 330 may be reduced to a pattern contained within one hexagon laid adjacent to itself repeatedly.

In FIG. 9, for example, hexagon 380 surrounds a part of auxetic element 330 which, if laid adjacent to itself repeatedly, would produce the pattern of auxetic element 330 as a whole. Hexagon 380 may accordingly be considered a unit of the regular hexagonal tessellation of auxetic element 330. As depicted, hexagon 380 contains an alternating sequence of six first portions 351 and six second portions 352 that surround and define the boundary of one aperture 360. A person of ordinary skill in the art will recognize that other hexagonal parts of auxetic element 330 could be similarly repeated to produce the pattern of auxetic element 330 as a whole.

Figure 10:
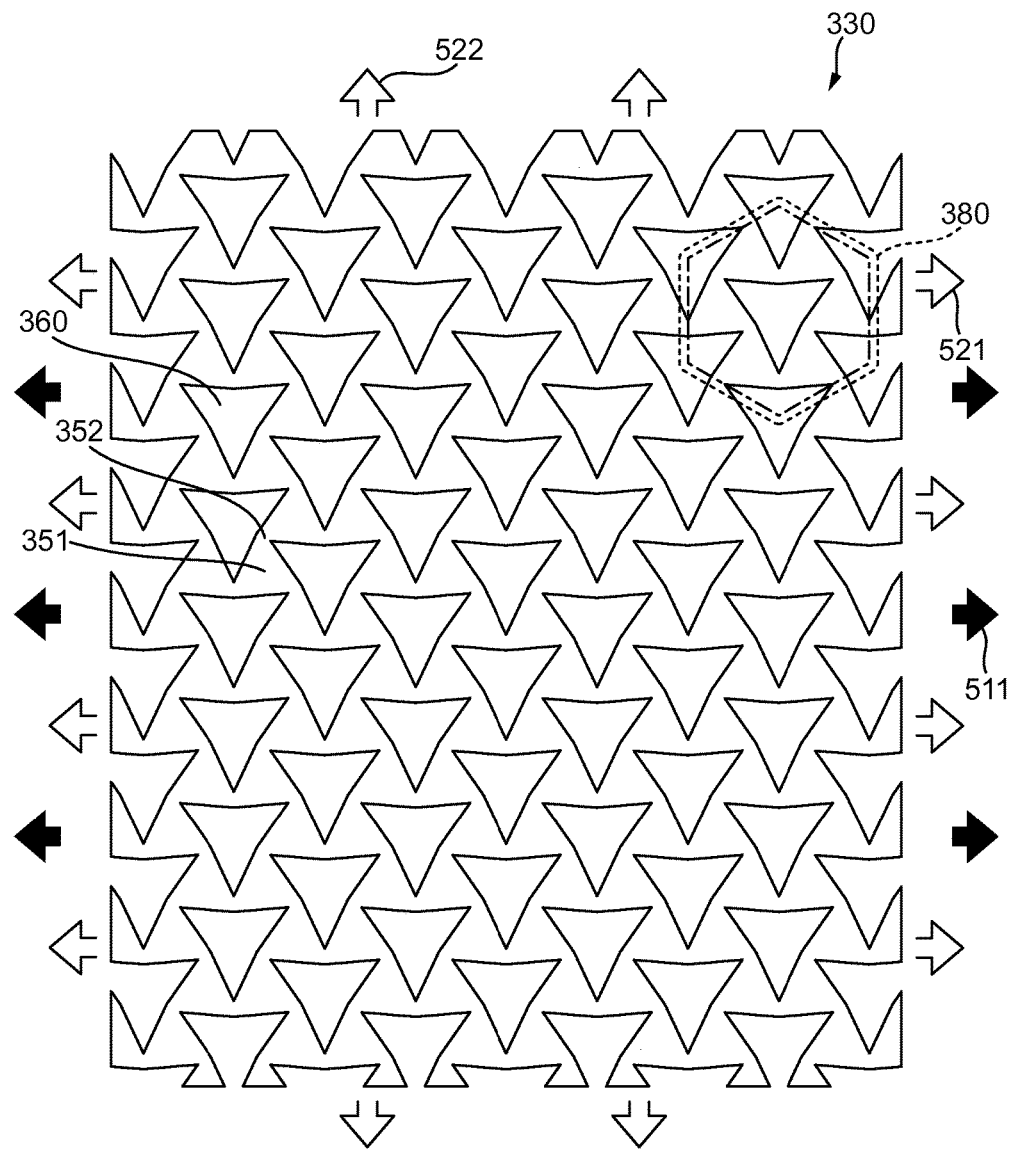
FIG. 10 is a plan view of the element of FIG. 10 under tension in a first direction (i.e., upon the application of an outwardly-directed force)
Figure 11:
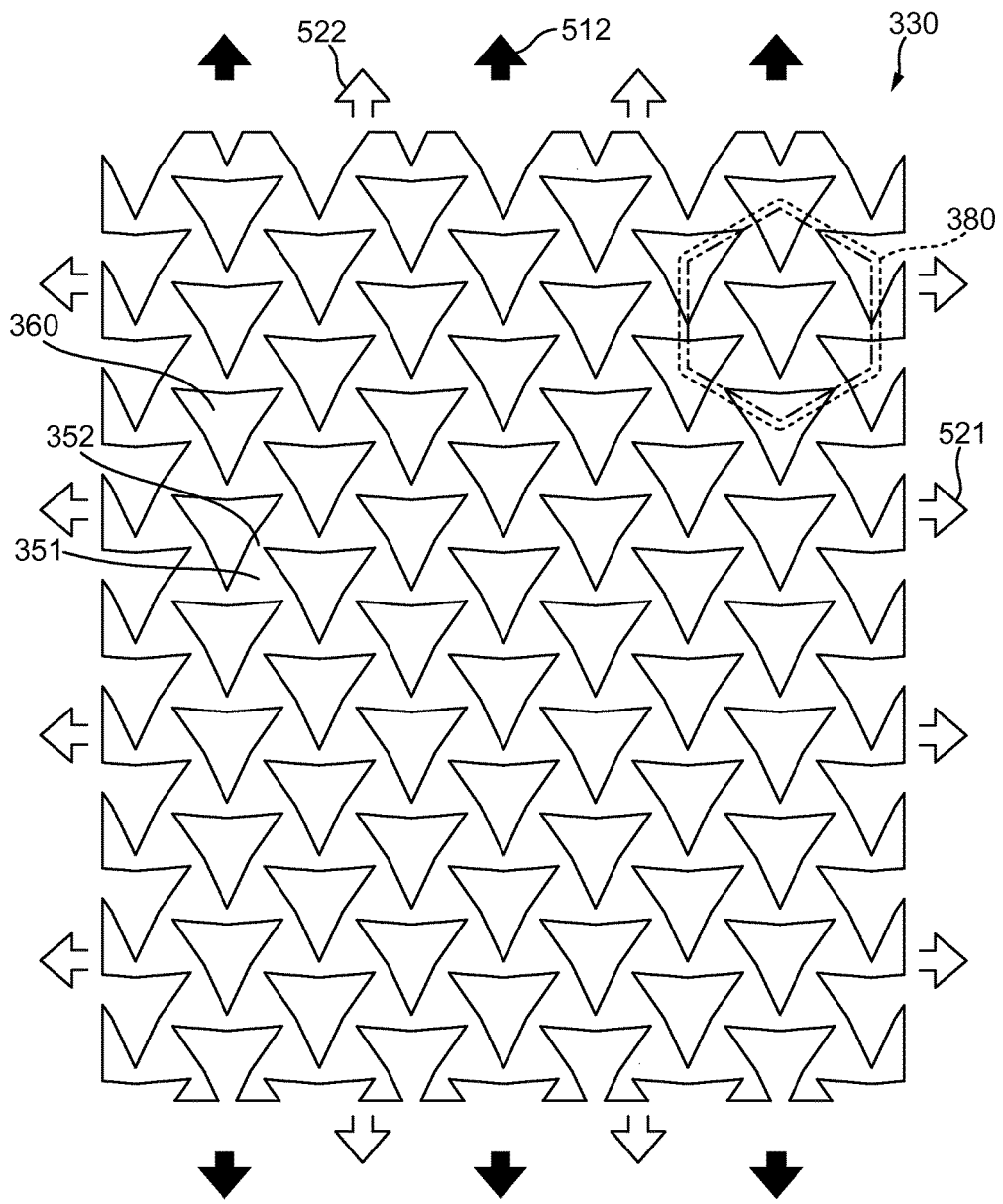
FIG. 11 is a plan view of the element of FIG. 10 under tension in a second direction.
Figure 12:
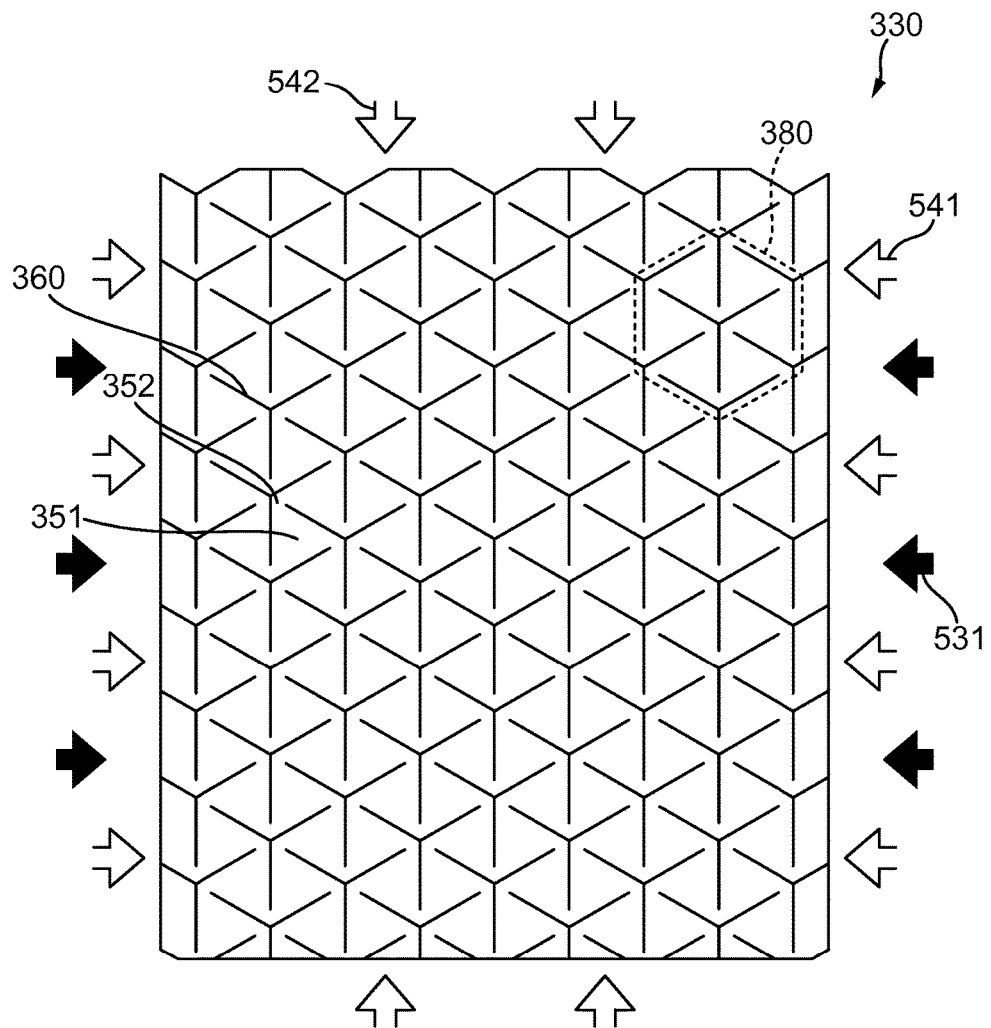
FIG. 12 is a plan view of the element of FIG. 10 under compression in a first direction (i.e., upon the application of an inwardly-directed force)

Due to the structure of first portions 351, second portions 352, and apertures 360, auxetic element 330 has advantageous properties in response to forces applied to it. FIGS. 10 and 11 depict auxetic element 330 under an applied tension (i.e., an outwardly-directed or "pulling" force). FIG. 10 shows auxetic element 330 under application of a tension 511 being applied in a first direction (depicted using solid, closed arrows). In response to tension 511 in the first direction, auxetic element 330 exhibits an expansion 521 in the first direction (depicted using open arrows). However, in addition to expansion 521, auxetic element 330 also exhibits an expansion 522 in a second direction orthogonal to the first direction (also depicted using open arrows). In other words, when auxetic element 330 is pulled outward in one direction, it expands outward in both that direction and another, perpendicular direction.

Although the first direction is depicted as being between the left-hand and right-hand sides of the figure, other first directions could be between any two opposite points on auxetic element 330. Similarly, although the second direction is depicted as being between the top and bottom of the figure, second directions could be orthogonal to other first directions.

FIG. 11 similarly depicts the application of a tension 512 in the second direction to auxetic element 330. Tension 512 is being applied in a direction orthogonal (or perpendicular) to the direction of tension 511 in FIG. 10. As FIG. 11 shows, auxetic element 330 responds to tension 512 by exhibiting not only an expansion 522 in the second direction, but also an expansion 521 in the first direction. In other words, as seen in FIGS. 10 and 11, a tension applied to auxetic element 330 in one direction induces auxetic element 330 to expand outward in both that direction and another, perpendicular direction.

Figure 13:
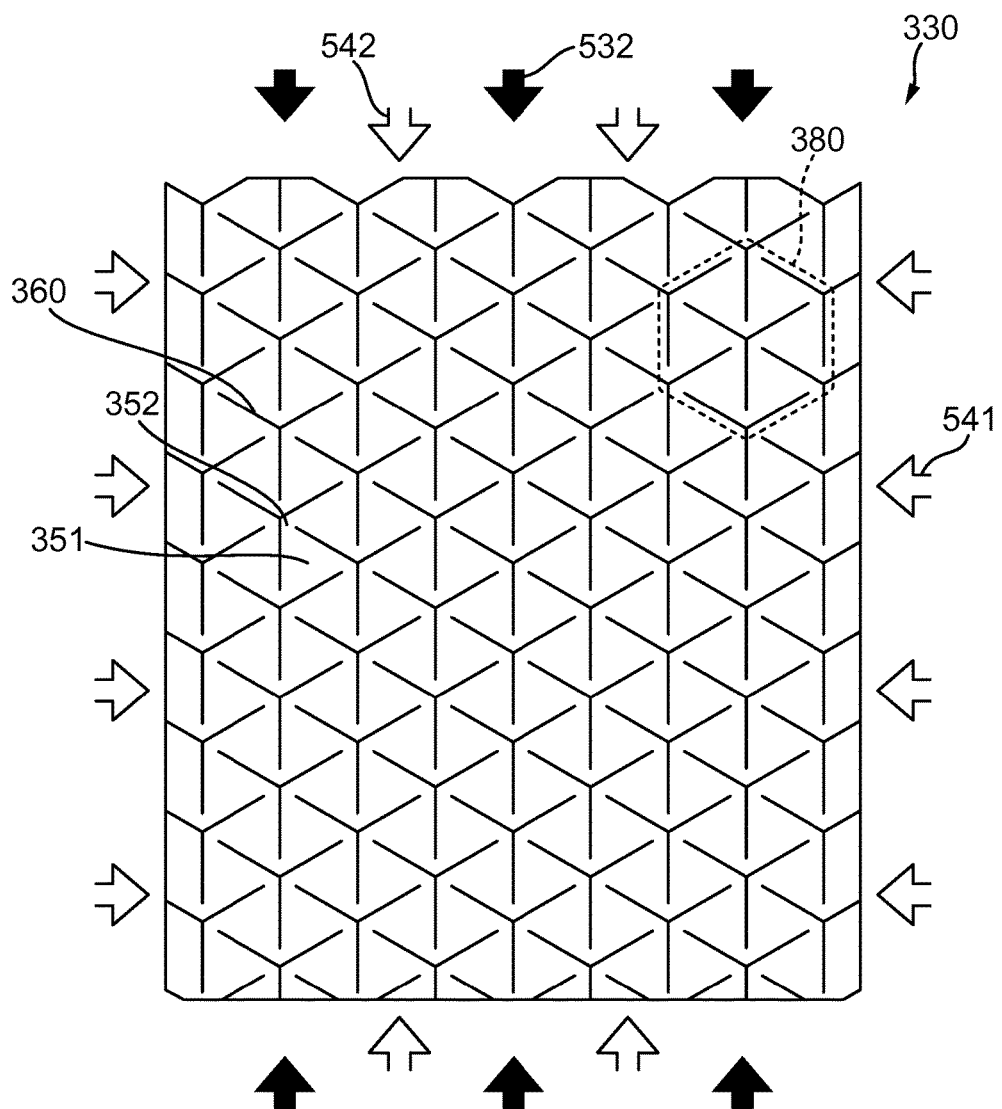
FIG. 13 is a plan view of the element of FIG. 10 under compression in a second direction.
Figure 14:
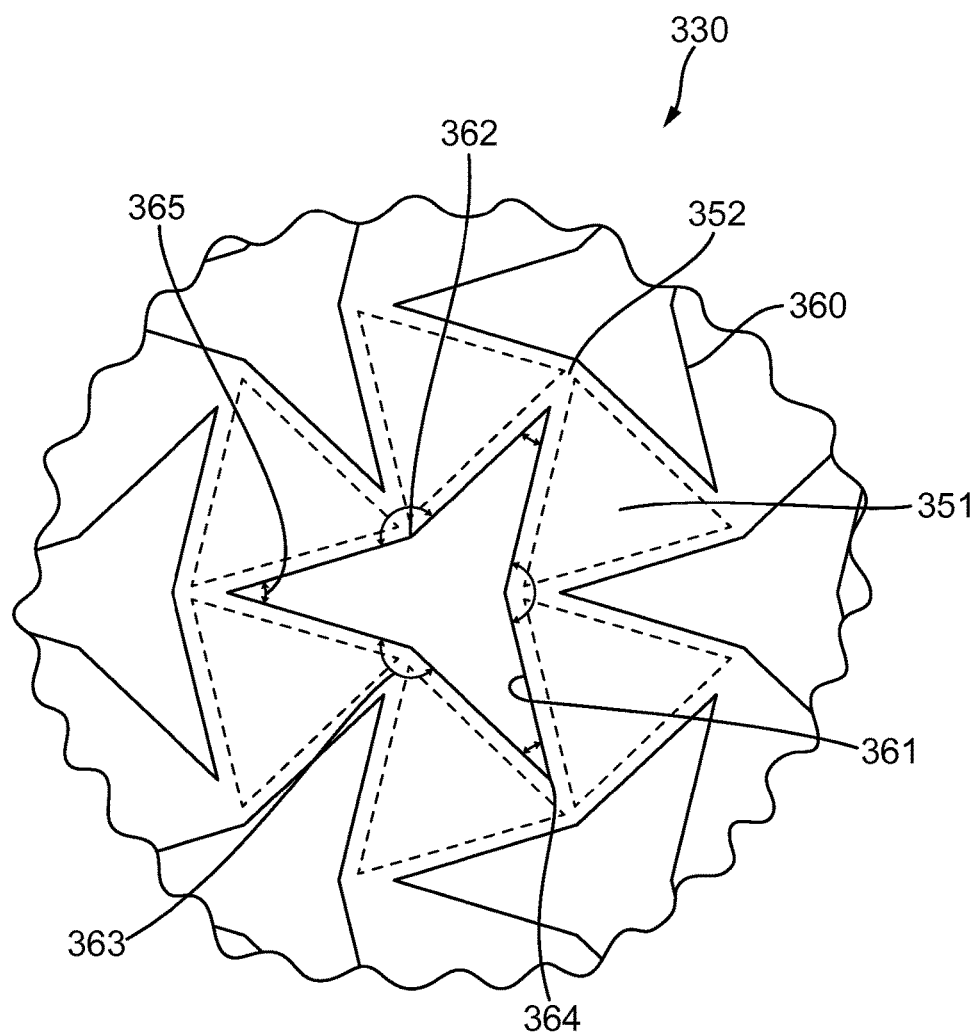
FIGS. 14-15 are plan views of a portion of the element of FIG. 10.

In contrast with FIGS. 10 and 11, FIGS. 12 and 13 depict the complementary behavior of auxetic element 330 under an applied compression (i.e., an inwardly-directed or "pushing" force). As depicted in FIG. 14, upon application of a compression 531 in the first direction (depicted using solid, closed arrows), auxetic element 330 exhibits both a contraction 541 in the first direction and a contraction 542 in the second direction (depicted using open arrows). Similarly, as depicted in FIG. 13, upon application of a compression 532 in the second direction, auxetic element 330 exhibits both contraction 541 in the first direction and contraction 542 in the second direction. That is, when auxetic element is compressed in one direction, it contracts inward in both that direction and another, perpendicular direction. (As with FIGS. 10 and 11, although the first direction is depicted as being between the left-hand and right-hand sides and the second direction is depicted as being between the top and bottom, other first directions could be between any two opposite points on auxetic element 330, and second directions could be orthogonal to any other first directions.)

Figure 15:
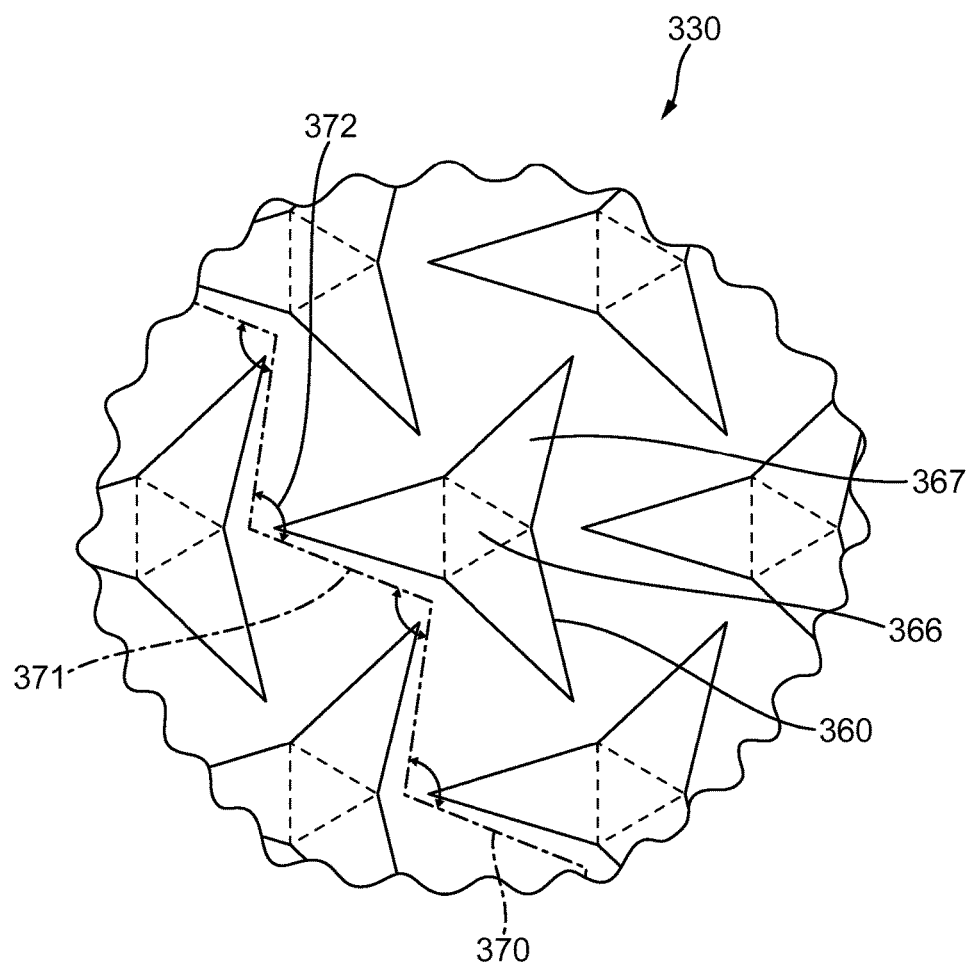

FIGS. 14 and 15 depict a portion of auxetic element 330 in greater detail. The depicted portion of auxetic element 330 includes six first portions 351 and six second portions 352 surrounding and defining an aperture 360 (as well as parts of the surrounding first portions 351, second portions 352, and apertures 360). As shown, the reentrant triangular shapes of apertures 360 have three sides 361, which define three inwardly-pointing vertices 362 associated with three outwardly-opening or reentrant angles 363. The reentrant triangular shapes of apertures 360 also have three outwardly-pointing vertices or points 364 associated with three inwardly-opening angles 365. As shown in FIGS. 14 and 15, each aperture 360 accordingly has a central portion 366 between three inwardly-pointing vertices 362, and three radial portions 367 between points 364 and inwardly-pointing vertices 362.

Apertures 360 are accordingly six-sided polygons, having three outwardly-opening angles (on the "sides" of their reentrant-triangle shapes) and three inwardly-opening angles (on the "points" of their reentrant-triangle shapes). The three sides 361 of the reentrant triangles of apertures 360 have reentrant angles 363 of between about 100 degrees and about 170 degrees when auxetic element 330 is not under tension (as depicted in FIGS. 14 and 15).

Each first portion 351 has a center 353 located at a central point of their triangular shapes, and each second portion 352 joins two first portions 351. In addition, the sides of the triangular shapes of first portions 351 correspond to segments of first portions 351 between adjacent second portions 352. With respect to those segments of first portions 351, each second portion 352 is connected to its nearest neighboring second portions 352 by segments of the two first portions 351 that it joins. Each second portion 352 accordingly has four nearest second portions 352 to which it is connected by sides of the two first portions 351 that it joins (at least at portions of auxetic element 330 spaced inward from its edges).

Auxetic element 330 thus contains a network of second portions 352 which are connected to each other by segments of first portions 351 that correspond to sides of the triangular shapes of first portions 351. Any two second portions 352 spaced apart from each other within auxetic element 330 are connected by a path between them comprising sides of first portions 351. FIG. 15 depicts an exemplary path 370 comprising segments 371, which are at angles 372 with respect to each other.

Figure 16:
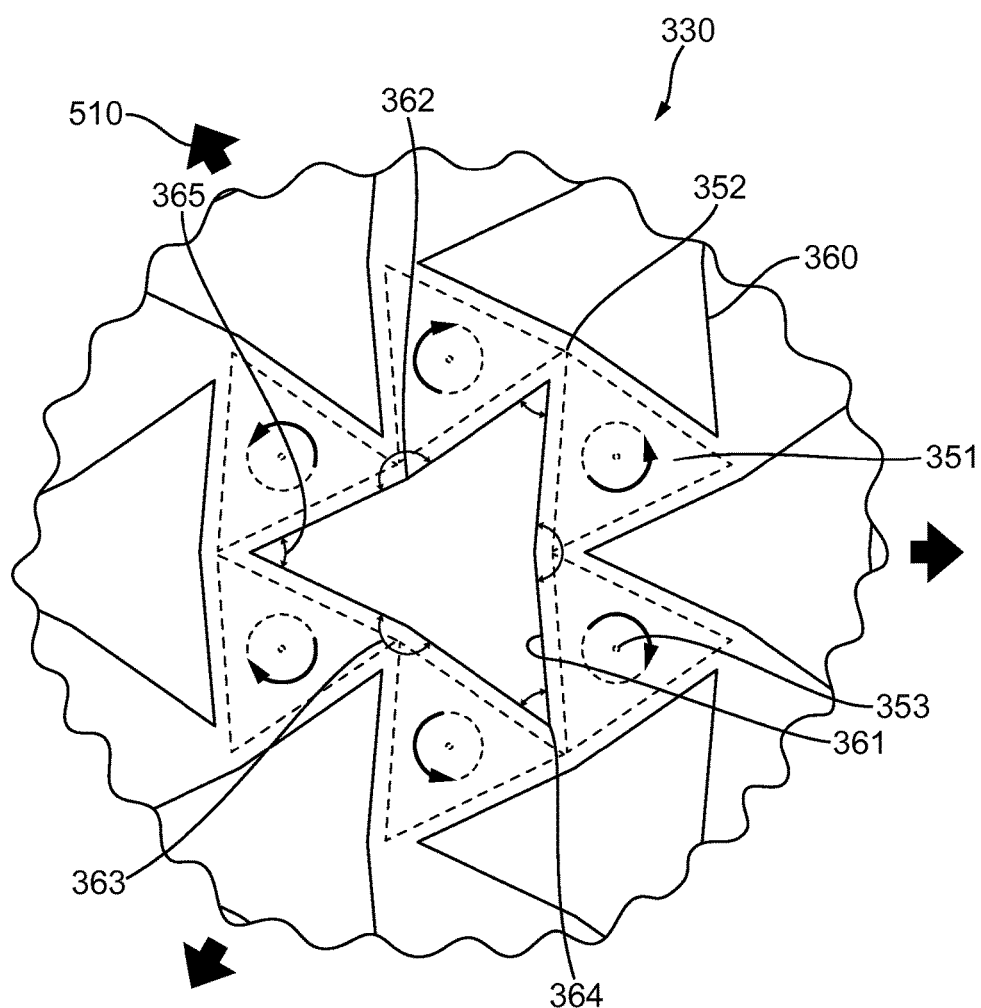
FIGS. 16-17 are plan views of the portion of the element of FIG. 10 under an applied tension.
Figure 17:
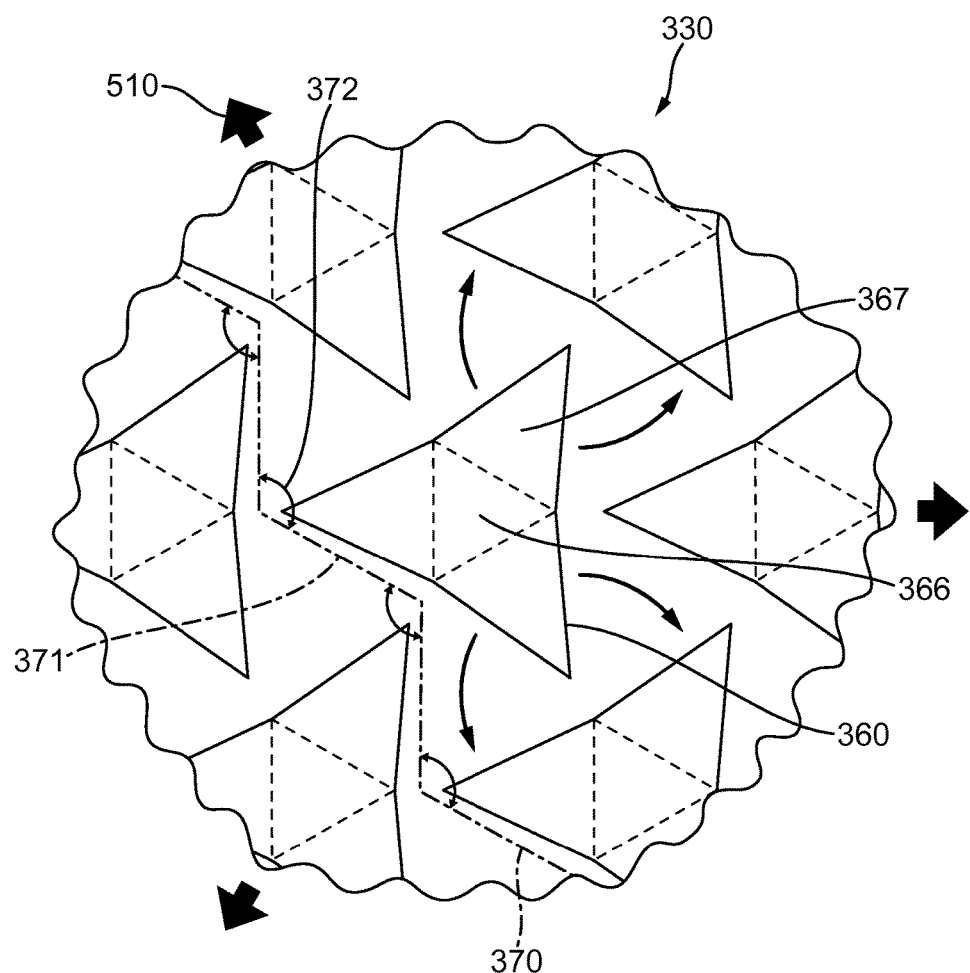

Due to the structure of auxetic element 330, first portions 351 are operable to rotate in response to an applied force. At the same time, due to the structure of auxetic element 330, apertures 360 are correspondingly operable to change shape in response to an applied force. In FIGS. 16 and 17, the portion of auxetic element 330 depicted in FIGS. 14 and 15 is shown under application of an outwardly-directed "pulling" force or tension 510. Under tension 510, first portions 351 rotate around their centers 353. More particularly, as shown in FIG. 16, any two nearest-neighboring first portions 351 within auxetic element 330 (i.e. two first portions 351 joined by a second portion 352) rotate around their centers 353 in opposite directions, one in a clockwise direction, and the other in a counter-clockwise direction.

At the same time, as shown in FIG. 17, any two nearest-neighboring first portions 351 rotate in opposite directions around the second portion 352 that joins them (again, one in a clockwise direction, and the other in a counter-clockwise direction). In the course of this rotation, outwardly-opening angles 363 and inwardly-opening angles 365 increase in magnitude, central portion 366 and radial portions 367 increase in area, and aperture 360 increases in area and changes shape.

FIG. 17 also depicts exemplary path 370 as being made more straight under the application of tension 510. Angles 372 between segments 371 increase in magnitude, and accordingly, for non-neighboring second portions 352 connected by path 370, a distance between those second portions 352 also increases. The application of a tension between two second portions 352 may thus straighten a path between the second portions 352, and may induce adjoining first portions 351 to rotate, which may in turn straighten orthogonal paths between other non-neighboring second portions 352 and thereby increase a distance between those other second portions 352.

Figure 18:
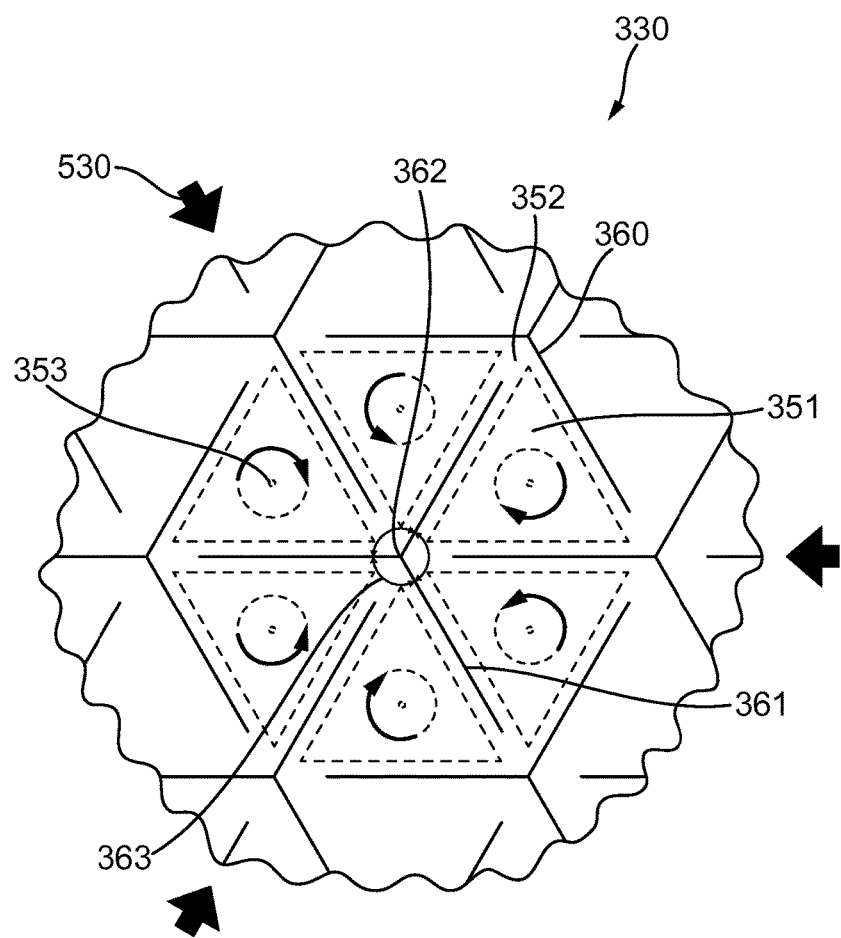
FIGS. 18-19 are plan views of the portion of the element of FIG. 10 under an applied compression.
Figure 19:
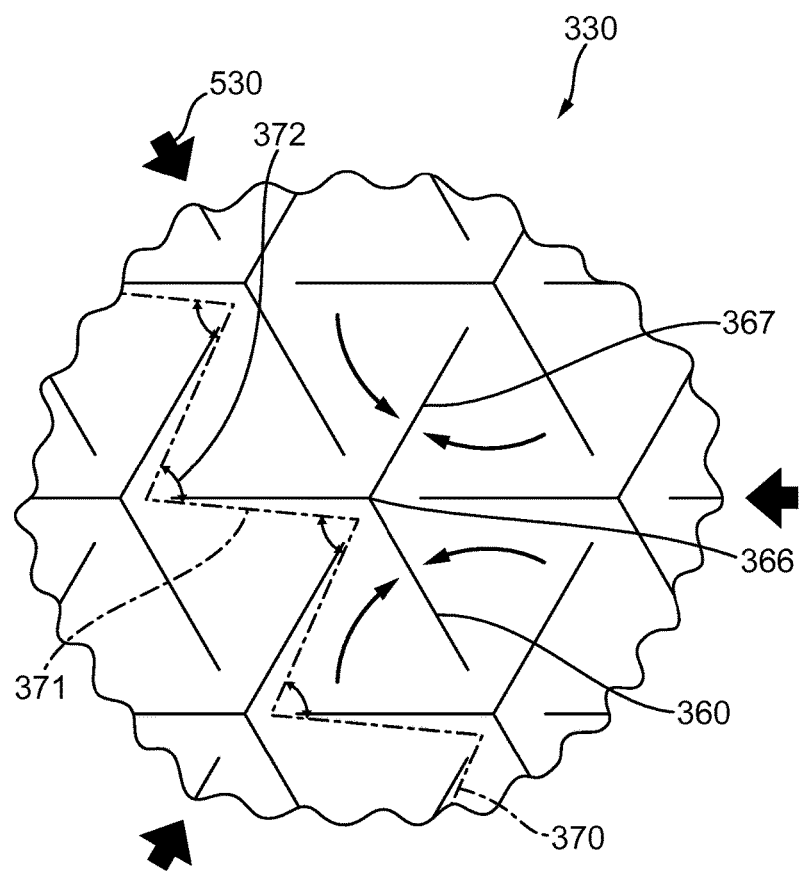

In contrast, FIGS. 18 and 19 depict auxetic element 330 under application of an inwardly-directed "pushing" force or compression 530. Under application of compression 530, first portions 351 rotate around their centers 353, but in directions opposite to their direction of rotation under application of tension 510. In other words, first portions 351 that rotate around their centers 353 in a clockwise direction when under tension rotate around their centers 353 in a counter-clockwise direction when under compression. Similarly, first portions 351 that rotate around their centers in a counter-clockwise direction when under tension rotate around their centers 353 in a clockwise direction when under compression.

At the same time, as shown in FIG. 19, nearest-neighboring first portions 351 rotate around the second portion 352 that joins them under application of compression 530, but in directions opposite to their directions of rotation under application of tension 510. First portions 351 that rotate around adjoining second portions 352 in a clockwise direction when under tension instead rotate counter-clockwise around those adjoining second portions 352 under compression, while first portions 351 that rotate counter-clockwise around adjoining second portions 352 when under tension instead rotate clockwise around those adjoining second portions 352 under compression. Meanwhile, outwardly-opening angles 363 and inwardly-opening angles 365 decrease in magnitude, and central portion 366 and radial portions 367 decrease in area. In some configurations of auxetic element 330, upon application of a sufficient compression, one or more of angles 363 may decrease to zero magnitude, and one or more of portions 366 and 367 may decrease to zero in area.

In FIG. 19, angles 372 between segments 371 are depicted as decreasing in magnitude, making path 370 less straight under the application of compression 530. Accordingly, for non-neighboring second portions 352 connected by path 370, a distance between those second portions 352 also decreases. Thus, the application of a compression between two second portions 352 may make a path between the second portions 352 less straight; in turn, this may induce a rotation in adjoining first portions 351, which may make an orthogonal path between other second portions 352 less straight and may thereby decrease a distance between those other second portions 352.

Auxetic Elements and Tensile Strands

Returning now to FIGS. 1-8, and with additional reference to FIGS. 20-25, due to the auxetic structure of element 330, footwear 10 may exhibit advantageous characteristics during use. For example, as depicted in FIGS. 1-8, auxetic element 330 is oriented along a plane extending in a first horizontal direction between forefoot region 11 and heel region 13, and extending in a second horizontal direction between medial side 14 and lateral side 15 of footwear 10. A tension applied to sole structure 300 in either the forefoot-heel direction (e.g., the longitudinal direction) or the medial-lateral direction will accordingly induce an expansion of auxetic element 330 along the plane in both the forefoot-heel direction and the medial-lateral direction.

Either at the beginning of a step (i.e., when the foot and footwear 10 initially contact the ground), or at the end of a step (i.e., when the foot and footwear 10 leave the ground), or at some time in between, a wearer's foot may move within footwear 10, or a force having at least some forefoot-heel component or medial-lateral component may otherwise push against footwear 10, or against portions of footwear 10. This may place an outwardly-directed force (i.e., a tension) or an inwardly-directed force (i.e., a compression) upon one or more local portions of auxetic element 330.

The force placed upon auxetic element 330 may then cause at least a local expansion or contraction in the structure of auxetic element 330. A localized tension or compression caused in the course of the wearer's use of footwear 10 may in turn induce a rotation in at least some first portions 351 near the corresponding portion of auxetic element 330, and the rotation of those first portions 351 may cause the localized expansion or localized contraction to propagate at least partially through auxetic element 330.

Meanwhile, as discussed above, tensile strands 230 may be secured in fixed position relative to specific locations along peripheral region 322 of sole structure 300, such as by being directly secured to peripheral region 322. Moreover, peripheral region 342 of auxetic element 330 may extend to peripheral region 322 of sole structure 300 and may span an entirety of a horizontal extent of sole structure 300. Because of this, tensile strands 230 may be indirectly or directly secured to specific locations along peripheral region 342, and may thus be secured in fixed position relative to specific locations along a horizontal extent of peripheral region 322 of sole structure 300.

However, tensile strands 230 may also be designed to be less stretchable than base layer 210. Base layer 210 may exhibit a first degree of expansion under a tension applied to upper 200, and tensile strands 230 may exhibit a second degree of expansion under the same tension, and the first degree of expansion may be greater than the second degree of expansion. Alternatively, in response to the same applied tension, tensile strands 230 may exhibit a degree of linear stretch that is less than the degree of linear stretch exhibited by portions of base layer 210 adjacent to tensile strands 230. For example, base layer 210 may exhibit a greater degree of stretch between two locations than a tensile strand 230 having a first end 231 and a second end 232 secured to those two locations. The expansion of base layer 210 between two such locations may accordingly be limited more by the properties of tensile strands 230 than by the properties of base layer 210.

Figure 20:
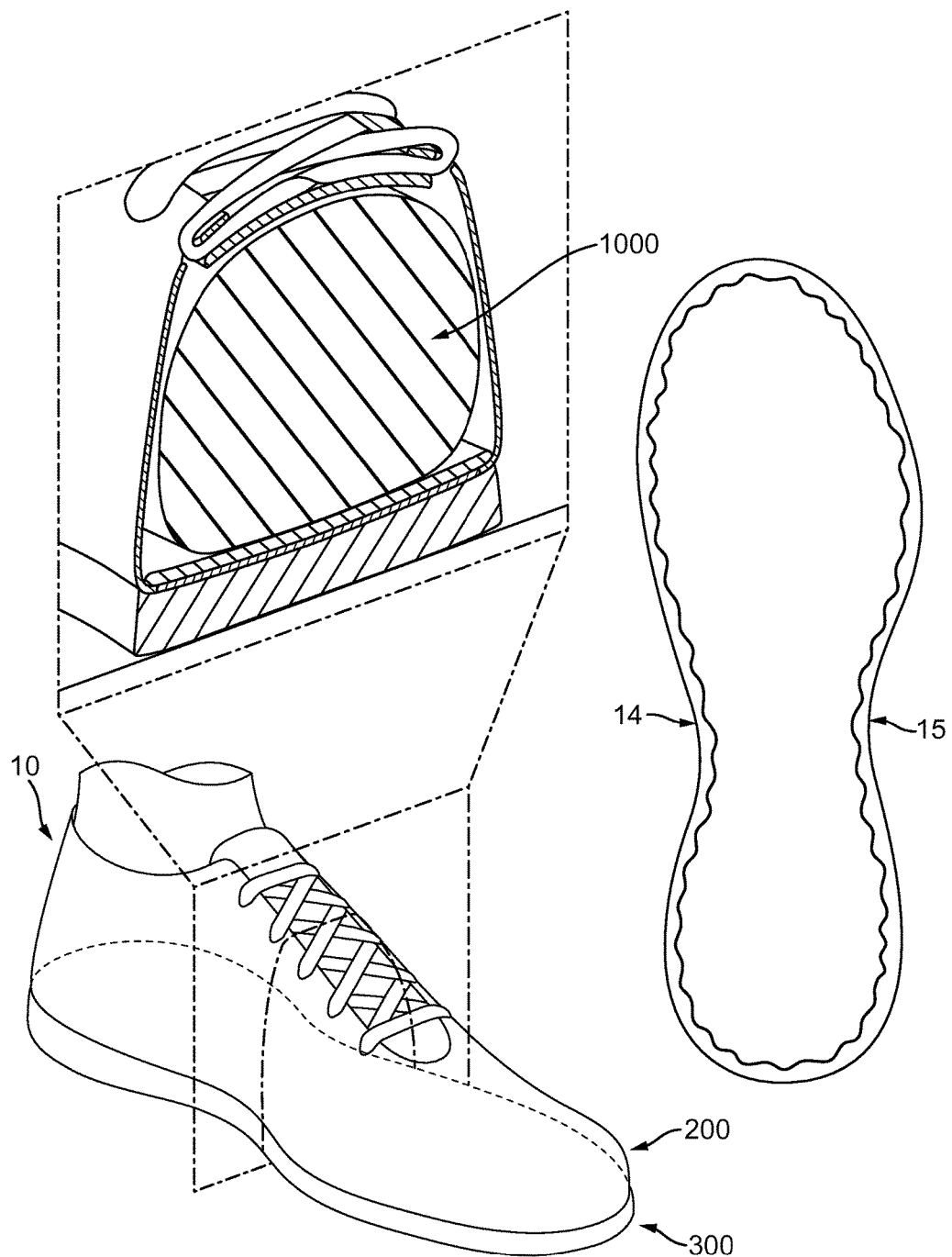
FIGS. 20-21 are lateral side perspective views, enlarged cut-away views, and top cut-away views of an alternate embodiment of the article of footwear being used by a wearer.

As a result, specific advantages may arise from the incorporation of tensile strands 230 between peripheral region 342 of auxetic element 330 and other locations of footwear 10. The use of tensile strands 230 may permit upper 200 to limit the transmission of tension to specific locations along auxetic element 330. This may facilitate the auxetic expansion (and contraction) of sole structure 300 with respect to specific, localized areas of auxetic element 330, which may in turn permit tuning of the localized dynamic adjustment of fit in response to an applied tension (or compression). The configurations of tensile strands 230 and auxetic element 330 may thus be tuned to advantageously cause footwear 10 to dynamically adjust its fit upon the wearer's foot in specific ways in response to specific forces placed upon it. For example, FIG. 20 depicts an alternate embodiment of footwear 10 around a foot 1000 of a wearer. In this alternate embodiment, upper 200 does not include tensile strands, and sole structure 300 does not include an auxetic element. FIG. 20 depicts footwear 10 while the wearer is in a static, standing position.

Figure 21:
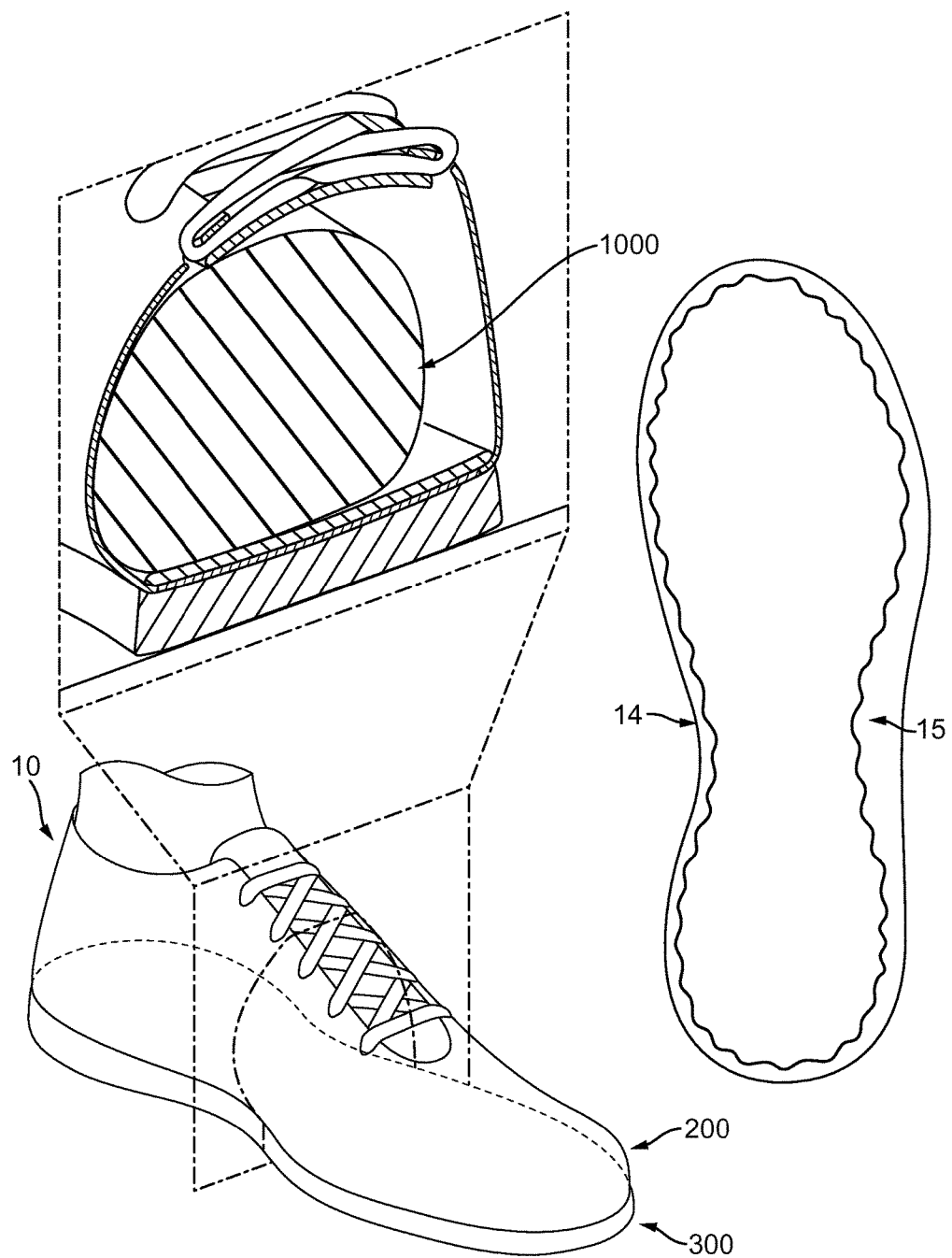

In FIG. 21, the wearer is in motion, and has braced footwear 10 against the ground in order to quickly change direction, as part of a lateral "banking" or "cutting" movement. As a result, foot 1000 is pushing outward on lateral side 15 of upper 200. In response, in a forefoot region and a midfoot region of footwear 10, lateral side 15 is pushed out over sole structure 300, and a gap has been left between foot 1000 and an inner surface of upper 200 on medial side 14.

Figure 22:
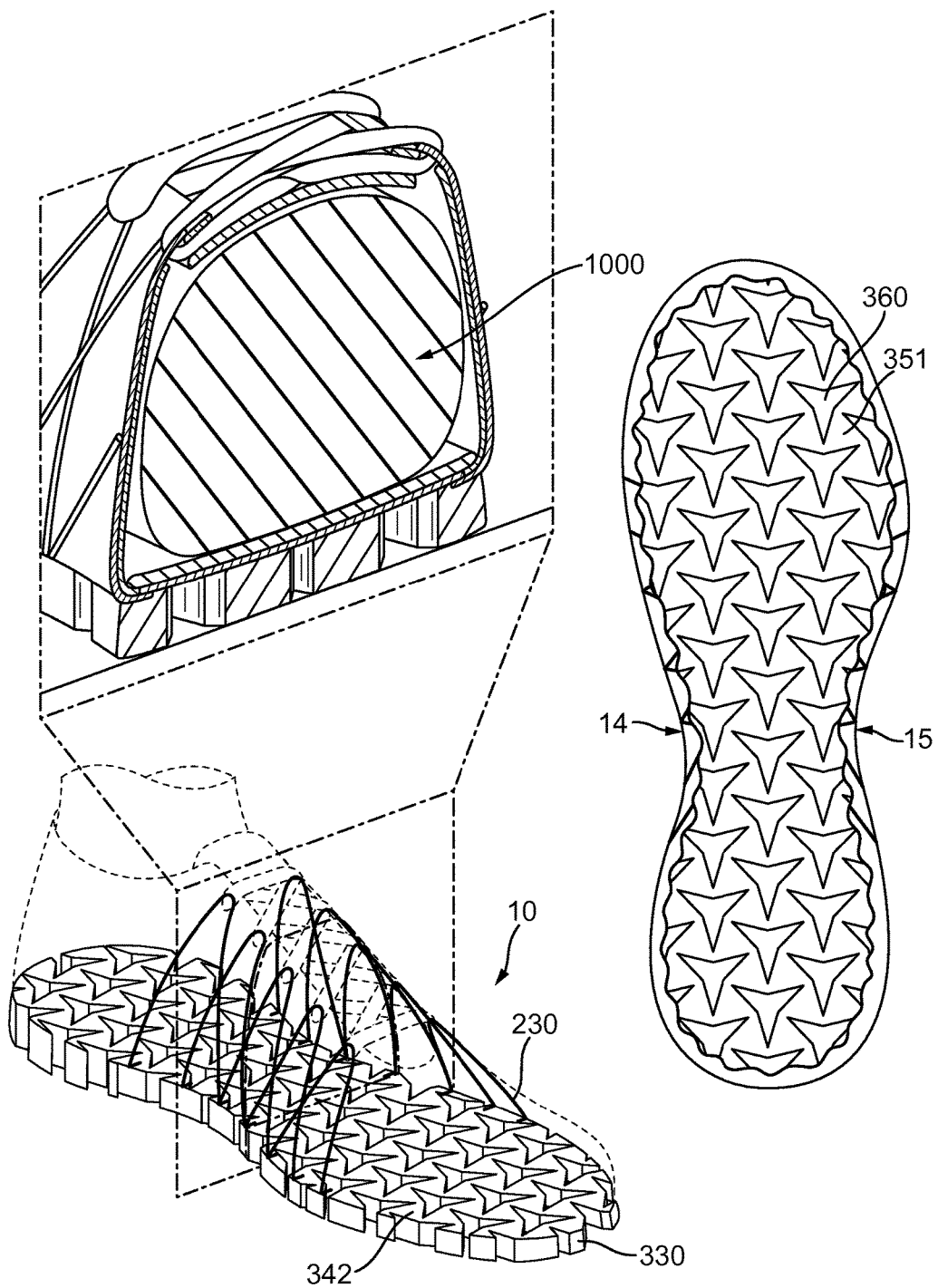
FIGS. 22-25 are lateral side perspective views, enlarged cut-away views, and top cut-away views corresponding with FIG. 5 and depicting the article of footwear of FIGS. 1-8 being used by a wearer.
Figure 23:
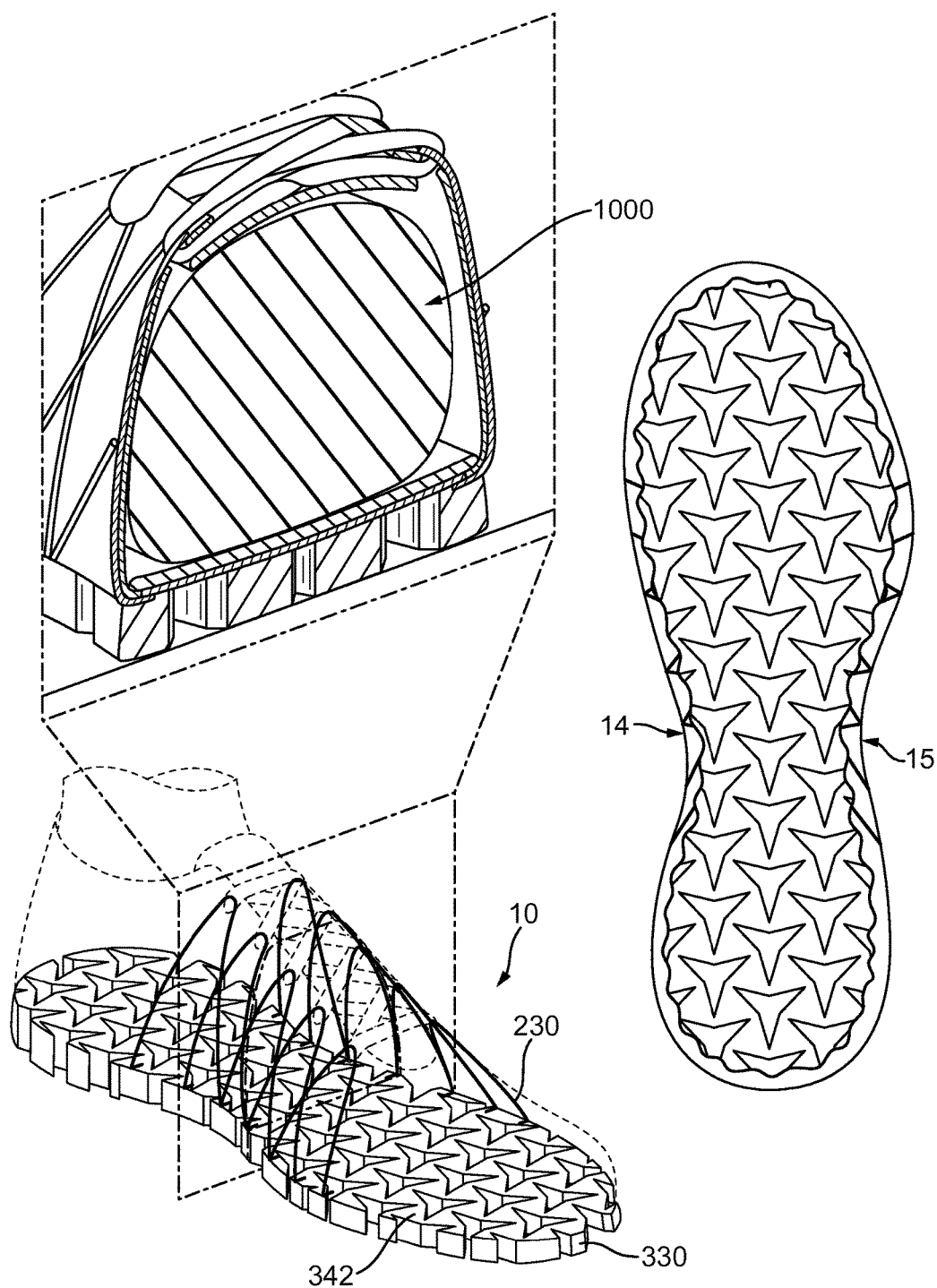

In contrast, FIG. 22 depicts the embodiment of footwear 10 of FIGS. 1-8 around foot 1000. The wearer begins in a static, standing position in FIG. 22. In FIG. 23, the wearer has just placed footwear 10 against the ground as part of a lateral "banking" or "cutting" movement, and foot 1000 has started to press against lateral side 15 of upper 200.

Figure 24:
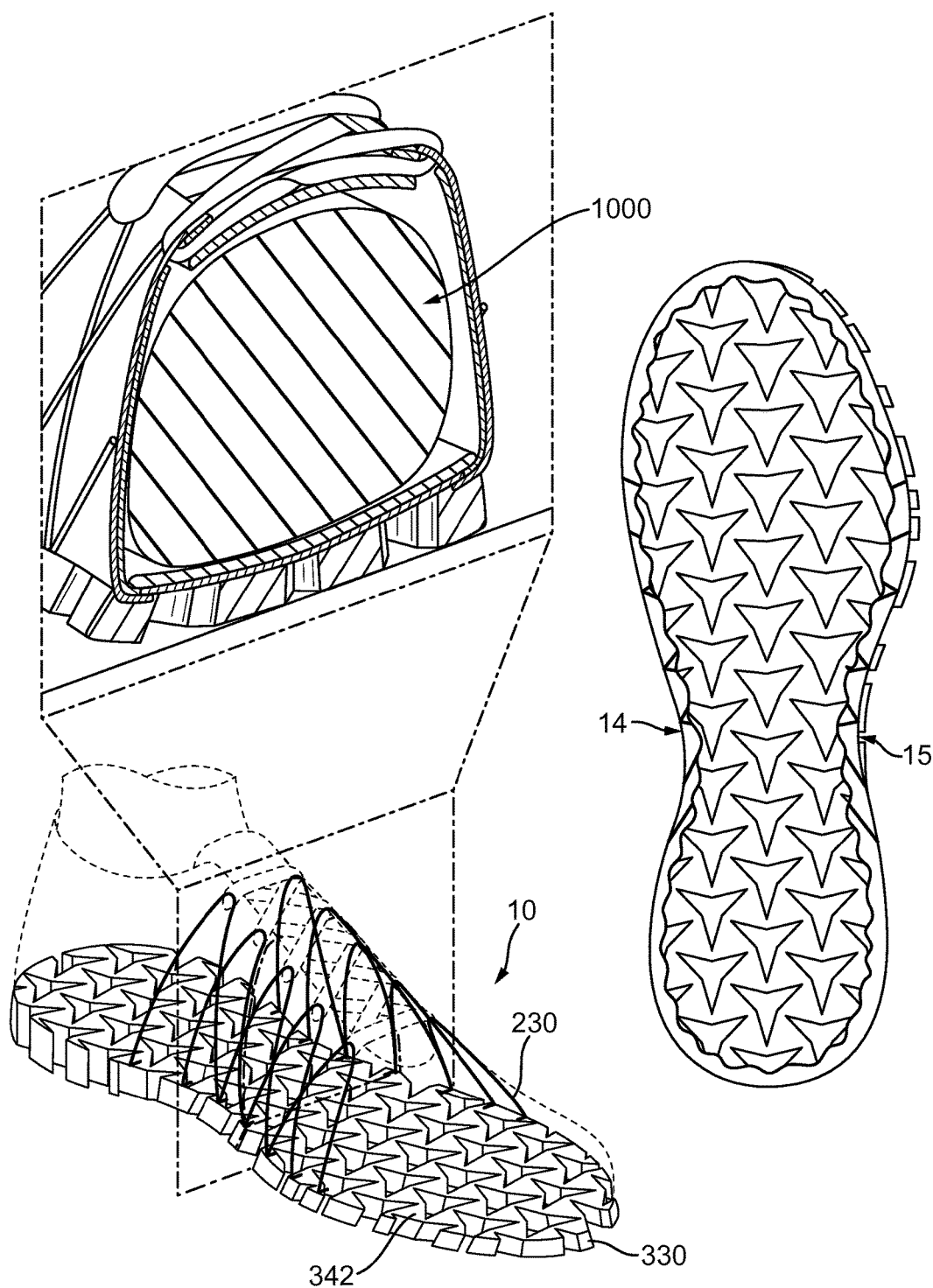

In FIG. 24, the wearer is in the middle of the "banking" or "cutting" movement, and has just changed the direction of movement. However, in contrast with the alternate embodiment of footwear depicted in FIGS. 20 and 21, foot 1000 in FIG. 23 has not extended outward beyond the sole structure. Instead, tensile strands 230 have applied tension to specific locations along peripheral region 342 of auxetic element 330, causing auxetic element 330 to exhibit a localized auxetic expansion in response. Auxetic element 330 has extended outward and slightly upward, remaining under foot 1000. Footwear 10 is accordingly kept better conformed to the foot of the wearer.

Figure 25:
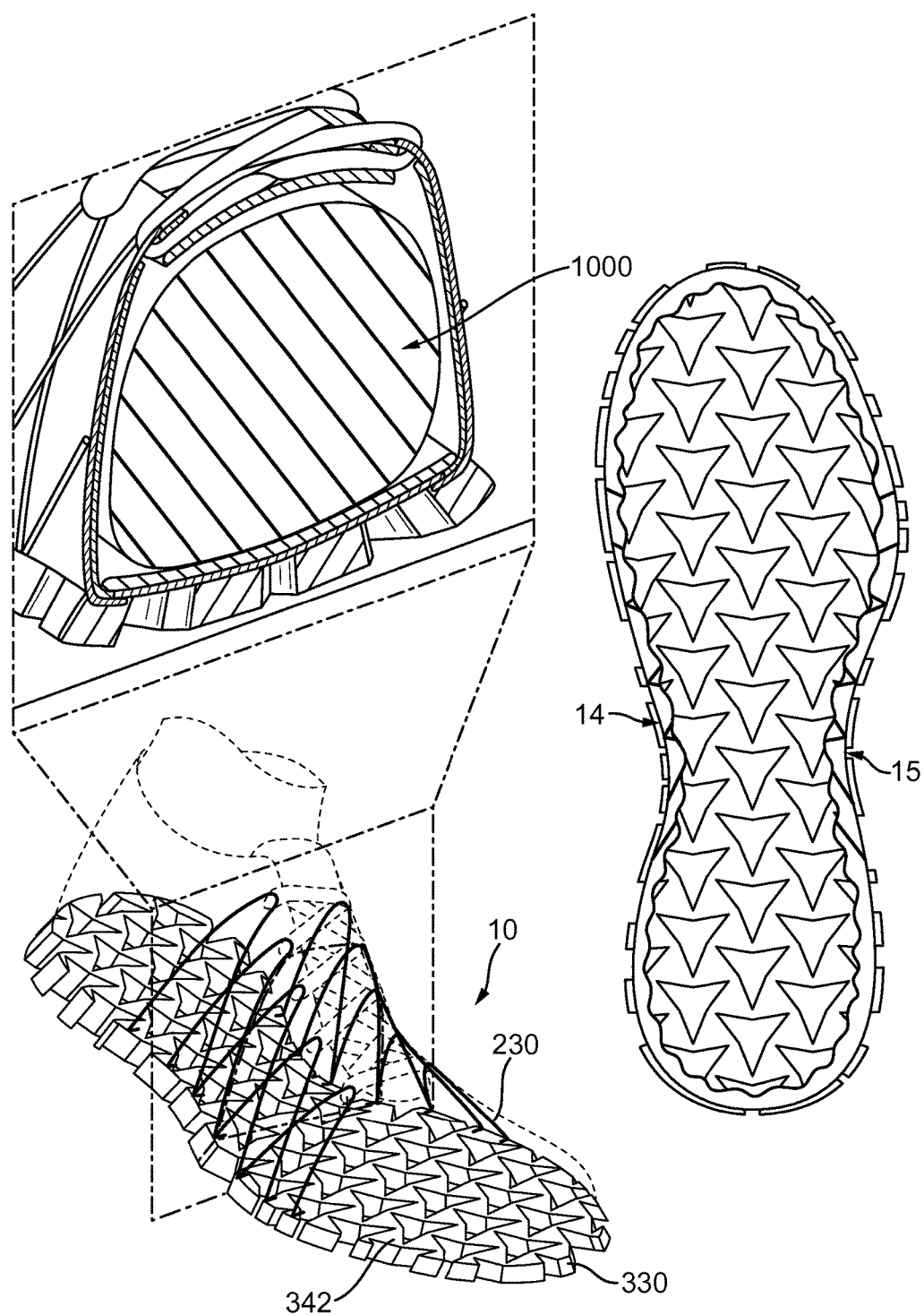

In another example, FIG. 25 depicts the embodiment of footwear 10 of FIGS. 1-8 as used by a wearer taking a step. In the course of taking the step, footwear 10 and sole structure 300 have bent at an area between forefoot region 11 and midfoot region 12. This causes auxetic element 330 to bend in a corresponding manner, applying a tension to auxetic element 330 in a forefoot-heel direction. The tension applied to auxetic element 330 in turn induces an expansion of auxetic element 330 in a forefoot-heel direction, and due to the auxetic nature of element 330, the expansion in the forefoot-heel direction in turn induces a corresponding expansion in a medial-lateral direction.

More specifically, the tension applied to the localized area of sole structure 300 may induce first portions 351 in that area to rotate (around second portions 352 that join them, and around their centers 353), may induce distances between second portions 352 in that area to increase, and may induce apertures 360 in that area to increase in area and change shape. Tensile strands 230 may then pull peripheral region 322 of sole structure 300 and peripheral region 342 of auxetic element 330 upward. Under tension from tensile strands 230, sole structure 300 is accordingly induced to wrap upward along the sides of footwear 10 around the area between forefoot region 11 and midfoot region 12, keeping footwear 10 better conformed to the foot of the wearer.

Further Configurations

Figure 26:
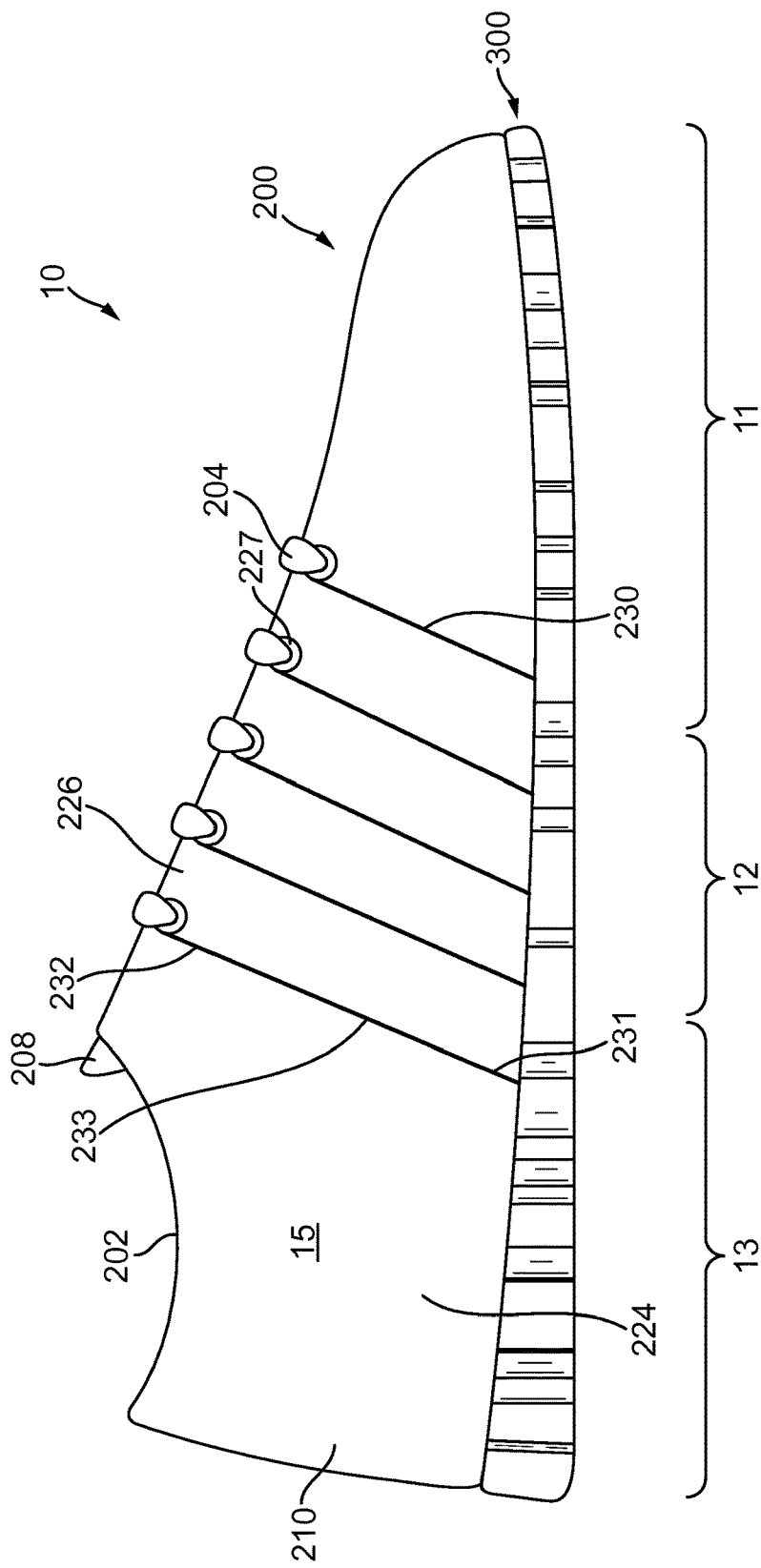
FIGS. 26-27 are lateral side elevational views corresponding with FIG. 2 and depicting further configurations of the footwear.

As discussed above and as depicted in FIGS. 1-8, tensile strands 230 have first ends 231 and second ends 232 that are fixed in position relative to peripheral region 322 of sole structure 300. In other configurations, however, first ends 231 and second ends 232 may be fixed in other positions. For example, FIG. 26 depicts a configuration of footwear 10 in which first ends 231 are fixed in position relative to peripheral region 322 of sole structure 300, but second ends 232 are fixed in position relative to lace apertures 227 in lace aperture region 226 of base layer 210. That is, instead of middle portions 233 of tensile strands 230 extending around lace apertures 227, at least some first ends 231 and second ends 232 of tensile strands 230 may be secured to areas proximal to lace apertures 227.

Furthermore, in some configurations, a tensile strand 230 may have a middle portions 233 fixed in position relative to a lace aperture 227, or two complementary tensile strands 230 may each have a first end 231 secured to have a fixed position relative to peripheral region 322 of sole structure 300, and may each have a second end 232 secured to have a fixed position relative to a lace aperture 227. Either configuration may have advantages similar to configurations in which a tensile strand 230 has a first end 231 and a second end 232 fixed in position relative to peripheral region 322 and a middle portion 233 extending around a lace aperture 227.

Figure 27:
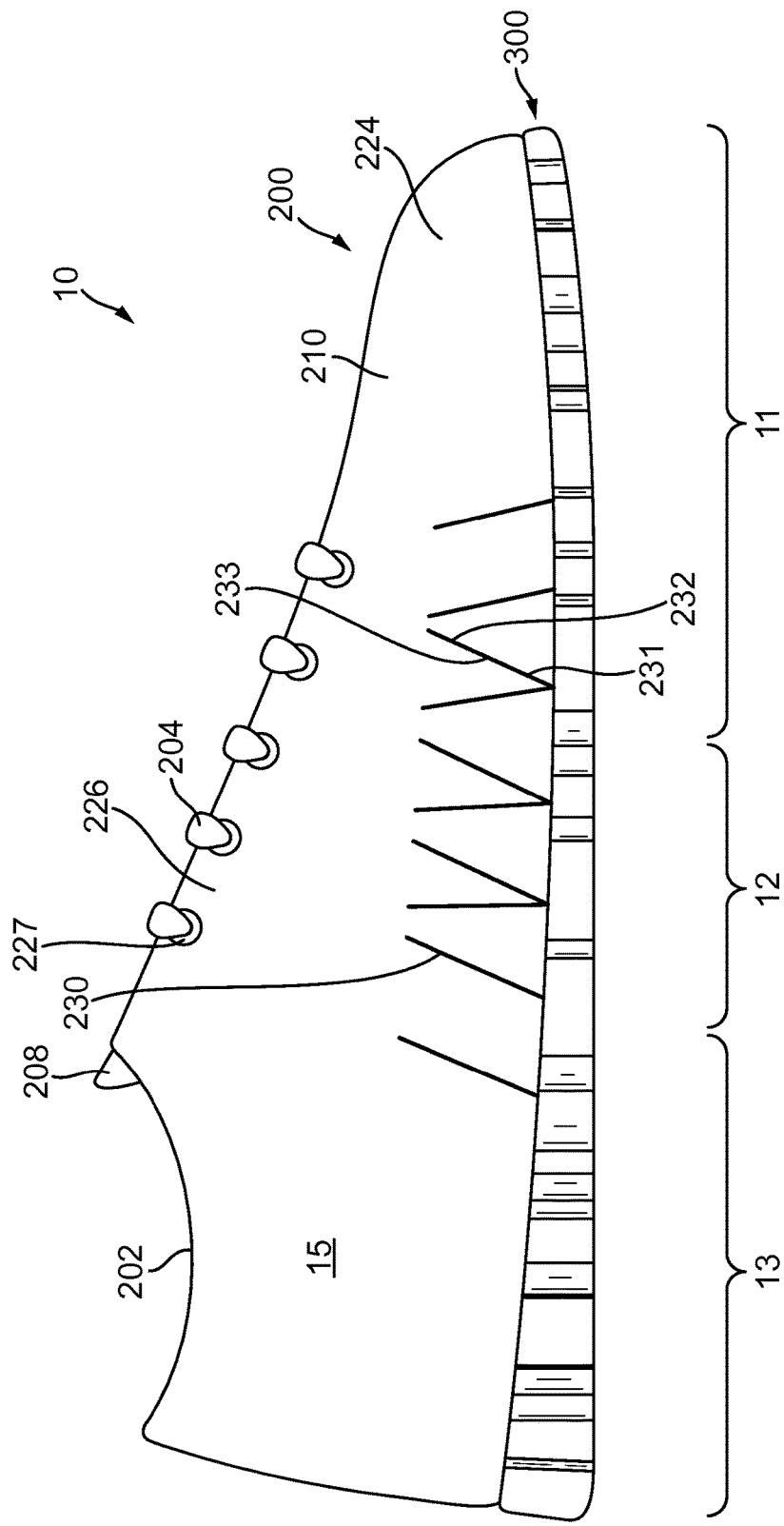

In another exemplary embodiment, as depicted in FIG. 27, at least some tensile strands 230 may not span an entire distance between peripheral region 222 and lace aperture region 226. In such configurations, at least some of tensile strands 230 may have a first end 231 secured in fixed position relative to peripheral region 322 of sole structure 300, and may have a second end 232 secured to middle region 224 of base layer 210.

Figure 28:
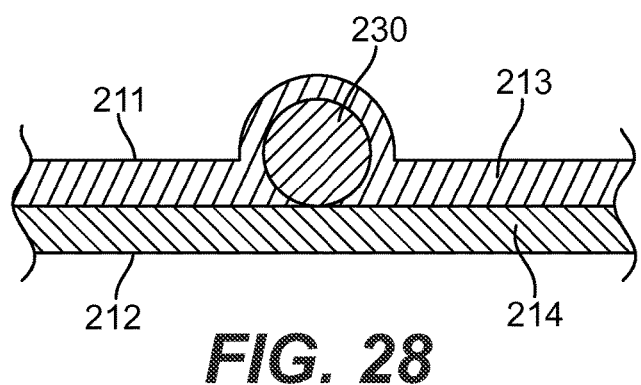
FIGS. 28-29 are cross-sectional views corresponding with FIG. 6 and depicting further configurations of the footwear.
Figure 29:
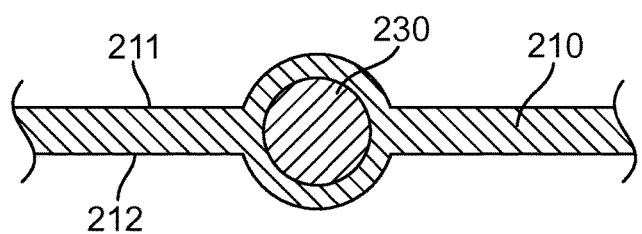

Tensile strands 230 are depicted in FIGS. 1-8 as lying adjacent to an outer surface 211 of base layer 210. In other configurations, tensile strands 230 may be otherwise situated relative to base layer 210. In FIG. 28 for example, base layer 210 comprises a first layer 213 of material at outer surface 211 of base layer 210, and a second layer of material 214 at inner surface 212 of base layer 210. Tensile strand 230 is situated between first layer 213 and second layer 214, and is at least partially enveloped by first layer 213. Alternatively, as depicted in FIG. 29, tensile strands 230 may be embedded within a material of base layer 210.

Tensile strands 230 may accordingly have the configuration of the threads of the articles of footwear disclosed in U.S. Pat. No. 7,870,681, or the strands of the articles of footwear disclosed in U.S. Pat. No. 8,132,340, or the strands of the articles of footwear disclosed in U.S. Pat. No. 8,631, 589, or the yarns of the articles of footwear disclosed in U.S. Pat. No. 8,490,299, such prior U.S. Patents being entirely incorporated herein by reference. Moreover, base layer 210 may have the configuration of the knitted components of U.S. Pat. No. 8,490,299. Also, in some embodiments, base layer 210 can include one or more auxetic portions, allowing one or more portions of upper 200 to stretch and deform auxetically. For example, in some embodiments, base layer 210 and/or other aspects of footwear 10 can include features disclosed in U.S. patent application Ser. No. 14/469,973, entitled Knitted Component Having Tensile Strand For Adjusting Auxetic Portion, which was co-filed with the present application on Aug. 27, 2014, he disclosure of which is incorporated by reference in its entirety.

FIGS. 1-8 depict auxetic element 330 as comprising those portions of sole structure 300 outside of sockliner 206, and as forming a ground-contacting surface of footwear 10. In other words, auxetic element 330 is depicted as forming an entirety of sole structure 300 outside of base layer 210. However, other configurations of sole structure 300 are possible.

Figure 30:
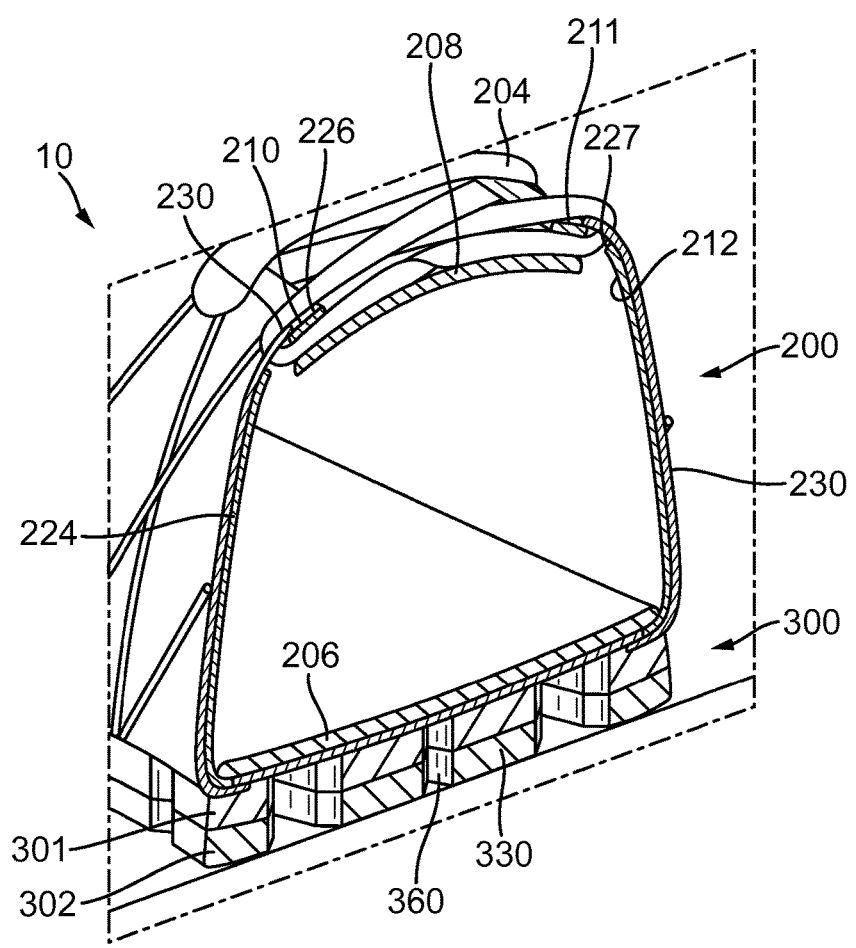
FIG. 30 is a cross-sectional view corresponding with FIG. 7 and depicting a further configuration of the footwear.

For example, with reference to FIG. 30, sole structure 300 may include a number of sole elements, such as a midsole element 301 and an outsole element 302. Midsole element 301 may be formed from a compressible polymer foam element (e.g., a polyurethane or ethylvinylacetate foam) that attenuates ground reaction forces (i.e., provides cushioning) when compressed between the foot and the ground during walking, running, or other ambulatory activities. Outsole element 302 may be secured to a lower surface of midsole element 301 and may be formed from a wear-resistant rubber material that is textured to impart traction. Auxetic element 330 may therefore include portions of midsole element 301 and outsole element 302.

In some configurations, auxetic element 330 may be either a midsole element having an auxetic structure or an outsole element having an auxetic structure. Auxetic element 330 may accordingly be an auxetic sole element, and may include either an auxetic midsole element, and auxetic outsole element, or both.

Although auxetic element 330 is depicted in FIGS. 1-8 as extending across an entirety of sole structure 300, auxetic element 330 may have an alternate span across sole structure 300. In various configurations, auxetic element 330 may extend across one or more portions of sole structure 300, but may be absent in one or more other portions of sole structure 300. Accordingly, one or more portions of sole structure 300 may be auxetic portions having an auxetic structure, and one or more portions may be non-auxetic portions without an auxetic structure.

Figure 31:
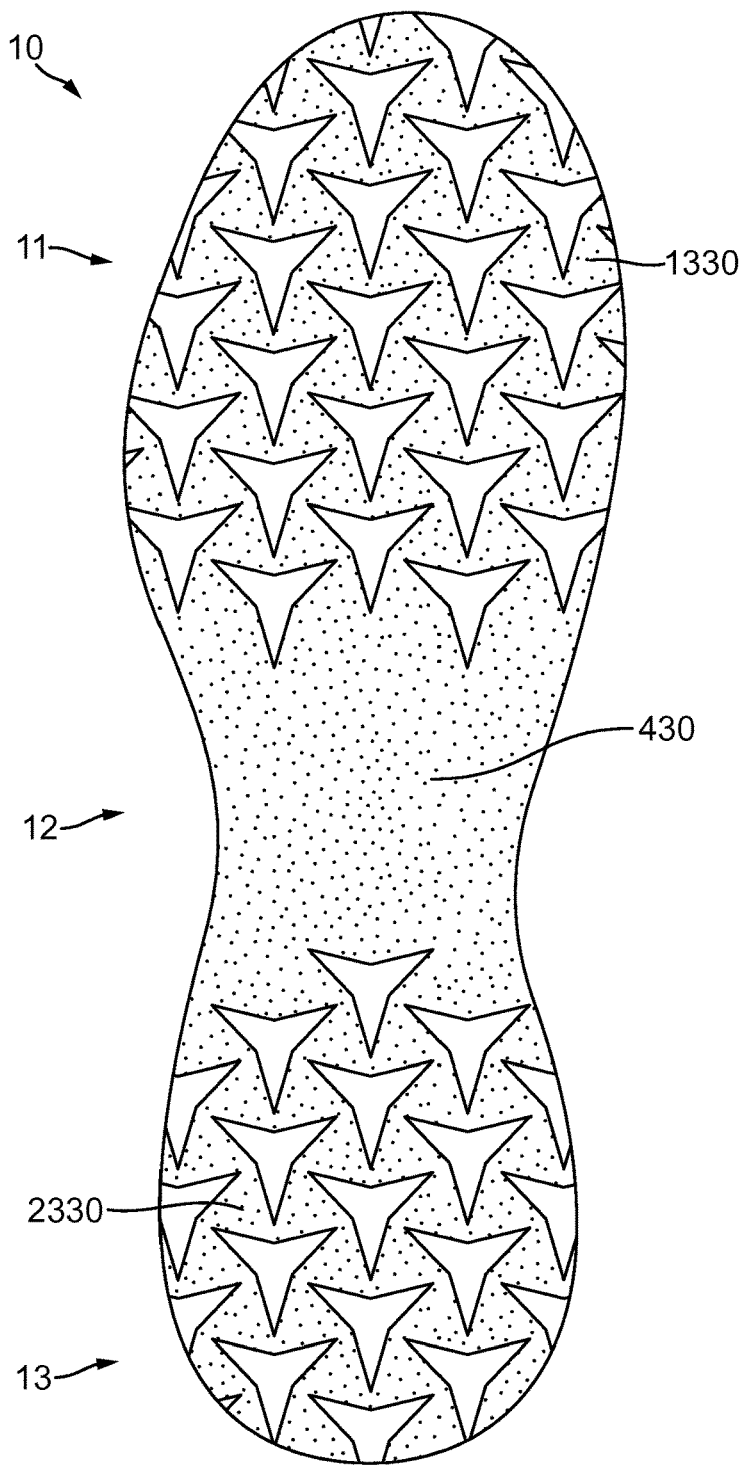
FIGS. 31-35 are bottom plan views corresponding with FIG. 9 and depicting further configurations of the footwear.
Figure 32:
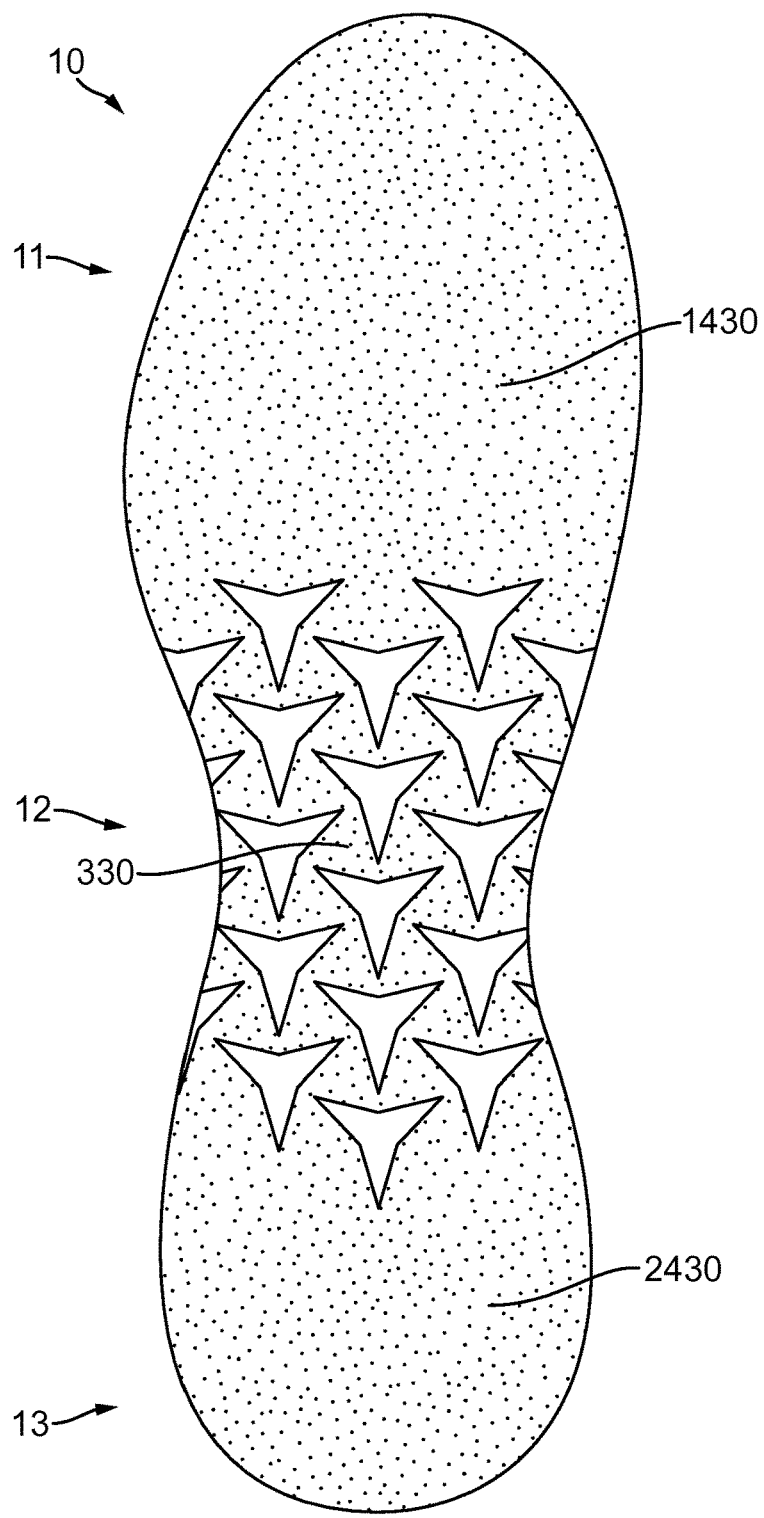

FIGS. 31-36 depict exemplary configurations of footwear 10 in which auxetic element 330 has an alternate span. For example, FIG. 31 depicts a configuration of sole structure 300 having an auxetic portion in forefoot region 11, an auxetic portion in heel region 13, and a non-auxetic portion 430 in between, in midfoot region 12. Accordingly, footwear 10 has an auxetic element 1330 in forefoot region 11, and another auxetic element 2330 in heel region 13. In contrast, sole structure 300 is depicted in FIG. 32 as having a non-auxetic portion 1430 in forefoot region 11, a non-auxetic portion 2430 in heel region 13, and an auxetic portion in midfoot region 12, and footwear 10 accordingly has only one auxetic element 330.

Figure 33:
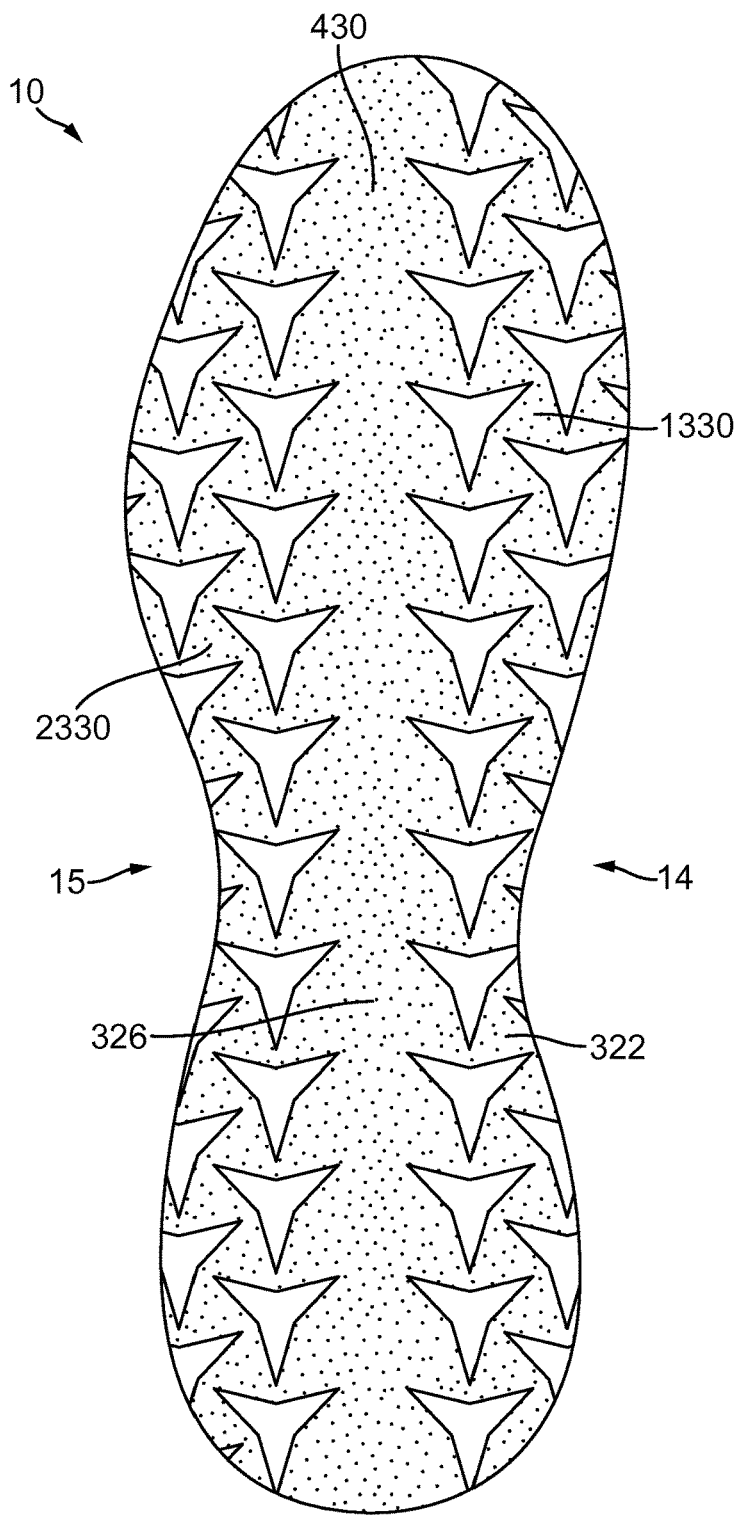
Figure 34:
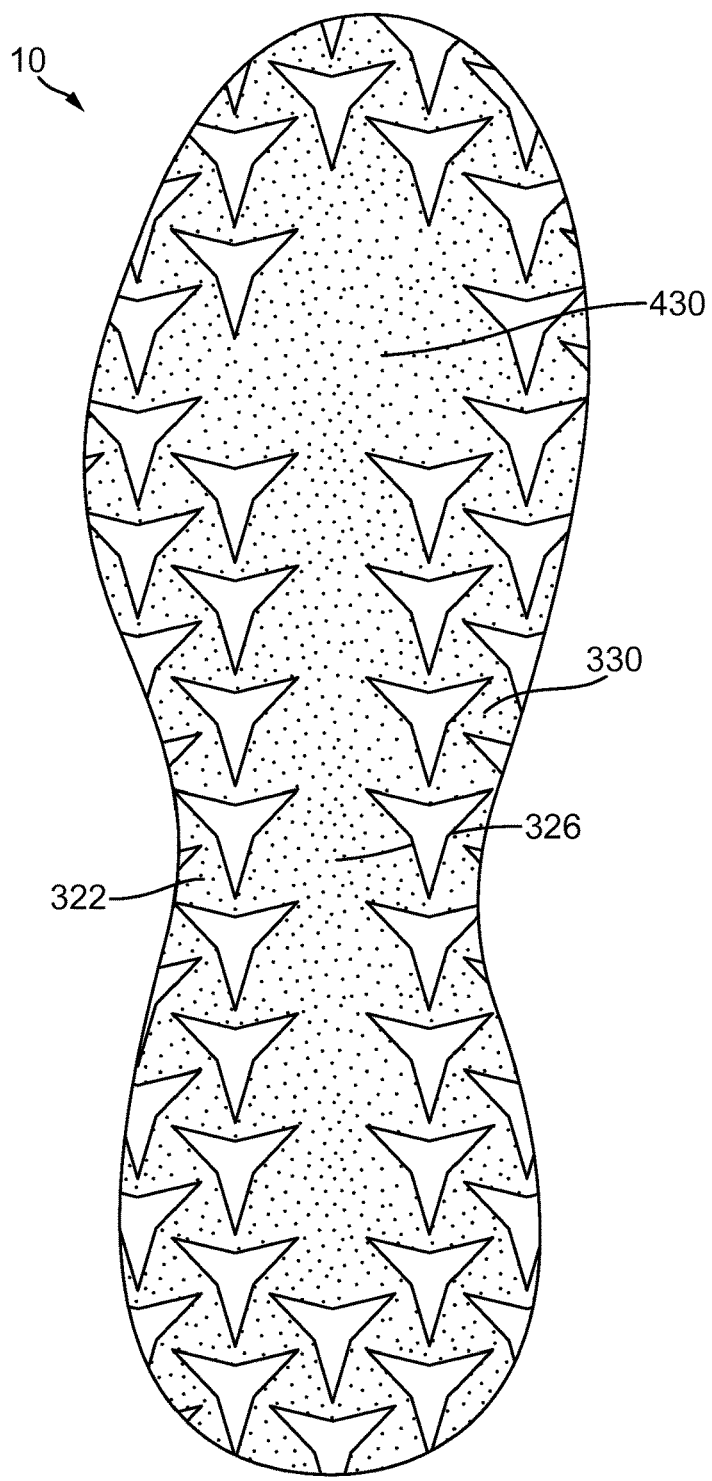
Figure 35:
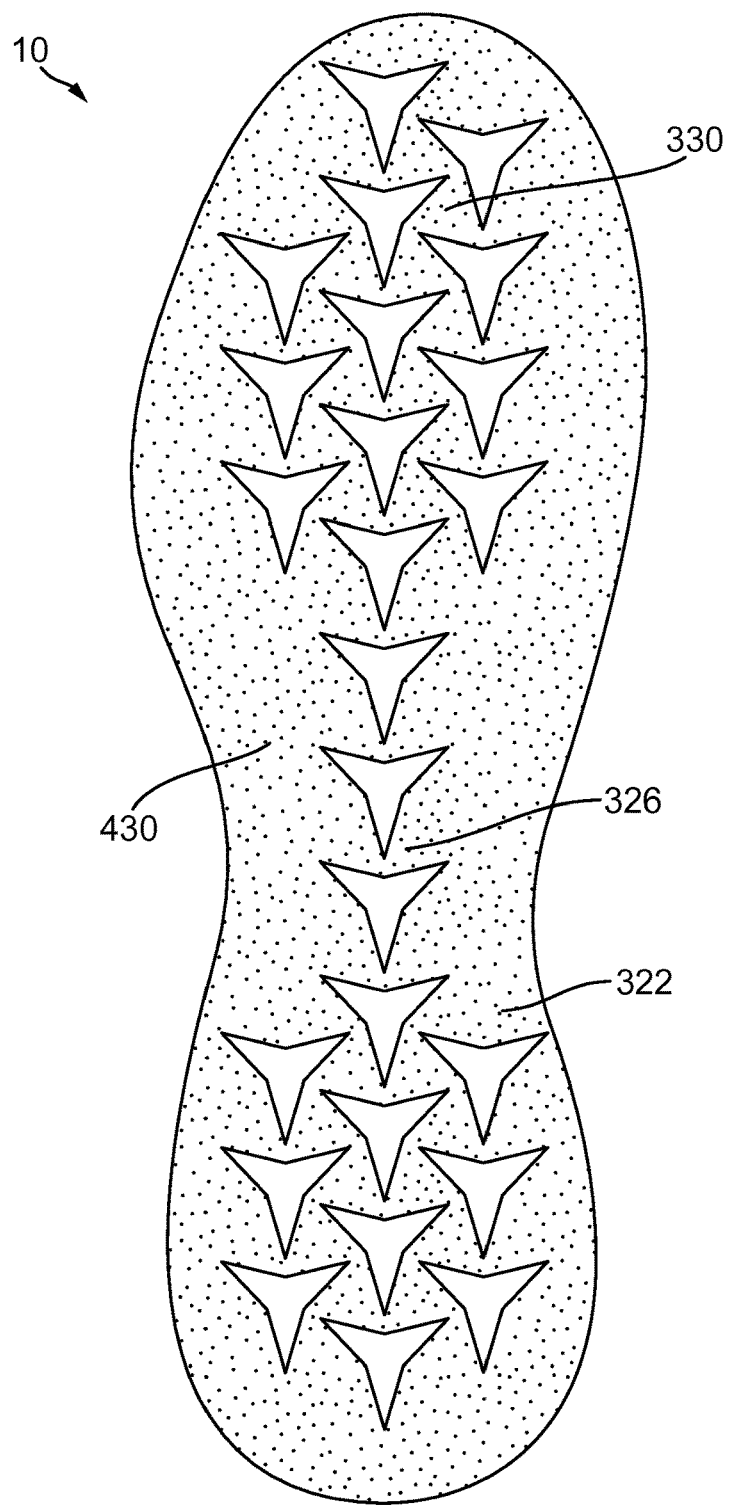

In FIG. 33, sole structure 300 is depicted as having an auxetic portion 1330 on medial side 14 and an auxetic portion 2330 on lateral side 15, separated by a non-auxetic portion running through central region 326. In this configuration, footwear 10 has two auxetic element 330. Similarly, in FIG. 34, sole structure 300 is depicted as having an auxetic structure on both medial side 14 and lateral side 15, but the auxetic structure continues through peripheral region 322 in both forefoot region 11 and heel region 13. In other words, an outside portion of sole structure 300 has an auxetic structure. Footwear 10 thus has one auxetic element 330, spanning peripheral region 322. In contrast to FIG. 34, FIG. 35 depicts an inside portion of sole structure 300 as having an auxetic structure, and thus footwear 10 has one auxetic element 330 spanning central region 326.

So, as depicted in FIG. 30, sole structure 300 may have various sole elements, such as a midsole element 301 or an outsole element 302, and either or both of those sole elements may be auxetic sole elements. At the same time, as depicted in FIGS. 31-36, sole structure 300 may have various portions, one or more of which may be auxetic, and one or more of which may be non-auxetic. Sole structure 300 may accordingly have a midsole element 301 or an outsole element 302, either one of which may have both auxetic portions and non-auxetic portions, and may therefore have a variety of auxetic elements 330.

FIGS. 1-8 depict auxetic element 330 as having apertures that are substantially the same size and substantially the same shape when element 330 is not under tension. In other configurations, however, a size of apertures 360, or a shape of apertures 360, or both may vary across auxetic element 330.

Figure 36:
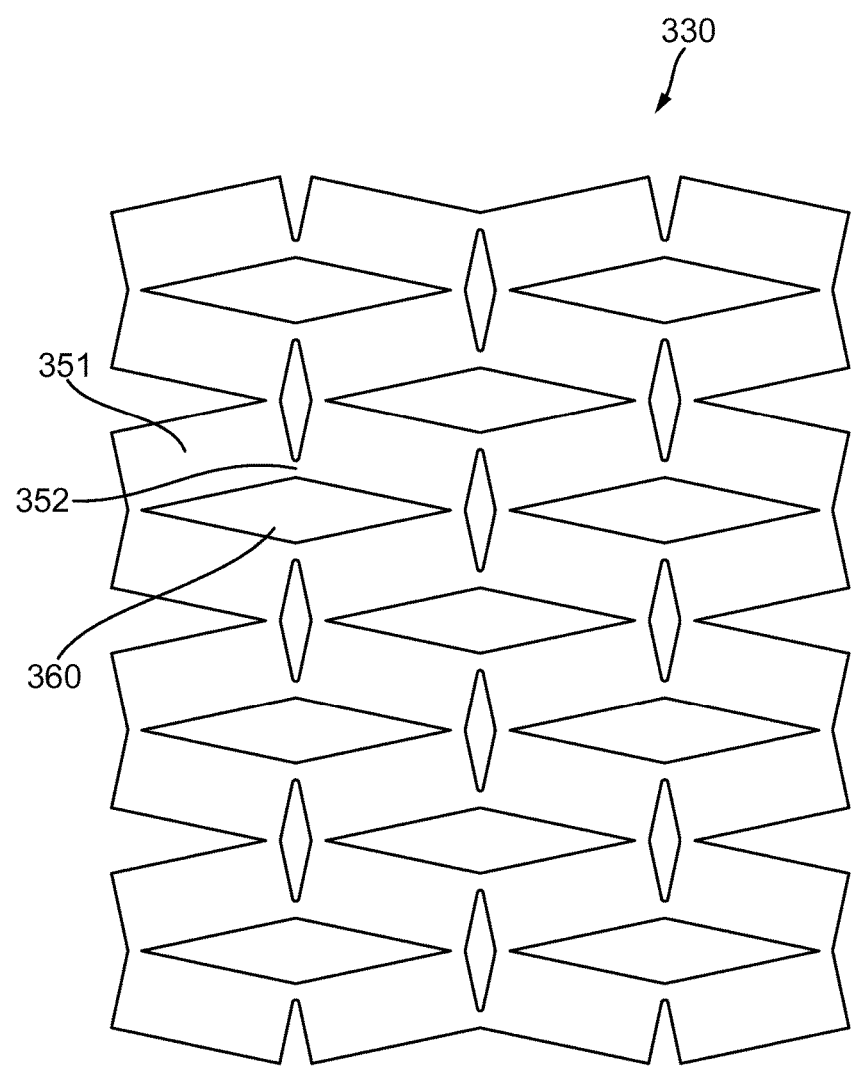
FIG. 36 is a plan view corresponding with FIG. 10 and depicting a further configuration of the auxetic element.
Figure 37:
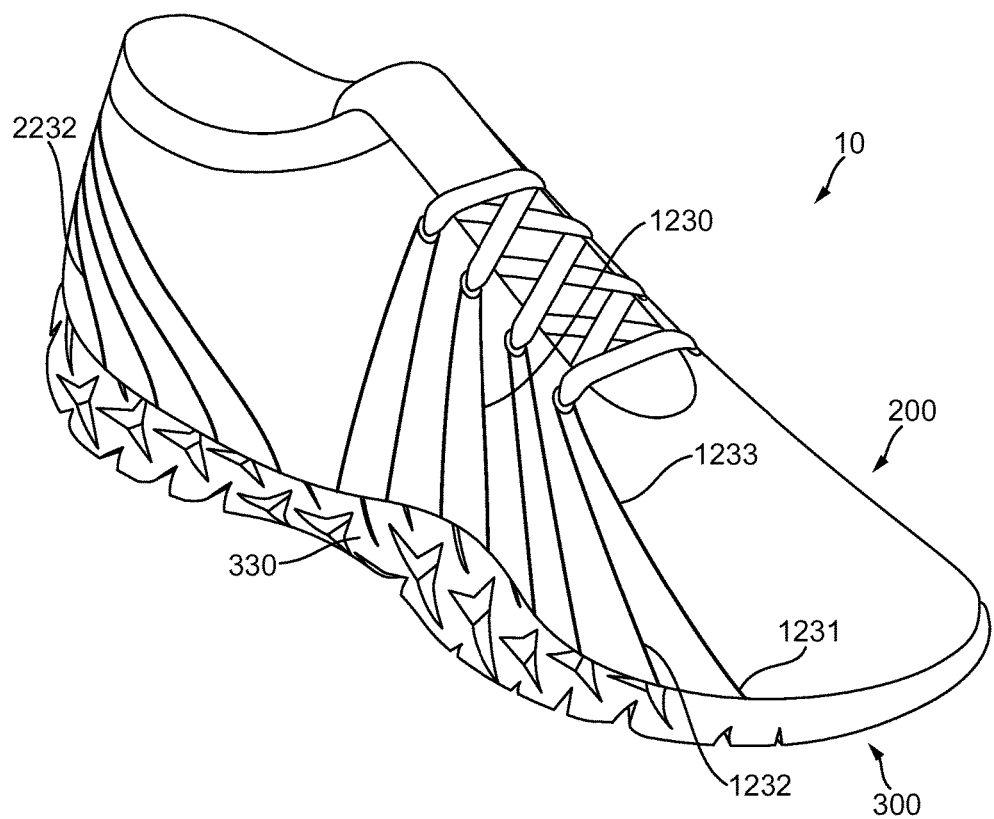
FIG. 37 is a lateral side perspective view of a further configuration of the footwear of FIG. 1.
Figure 38:
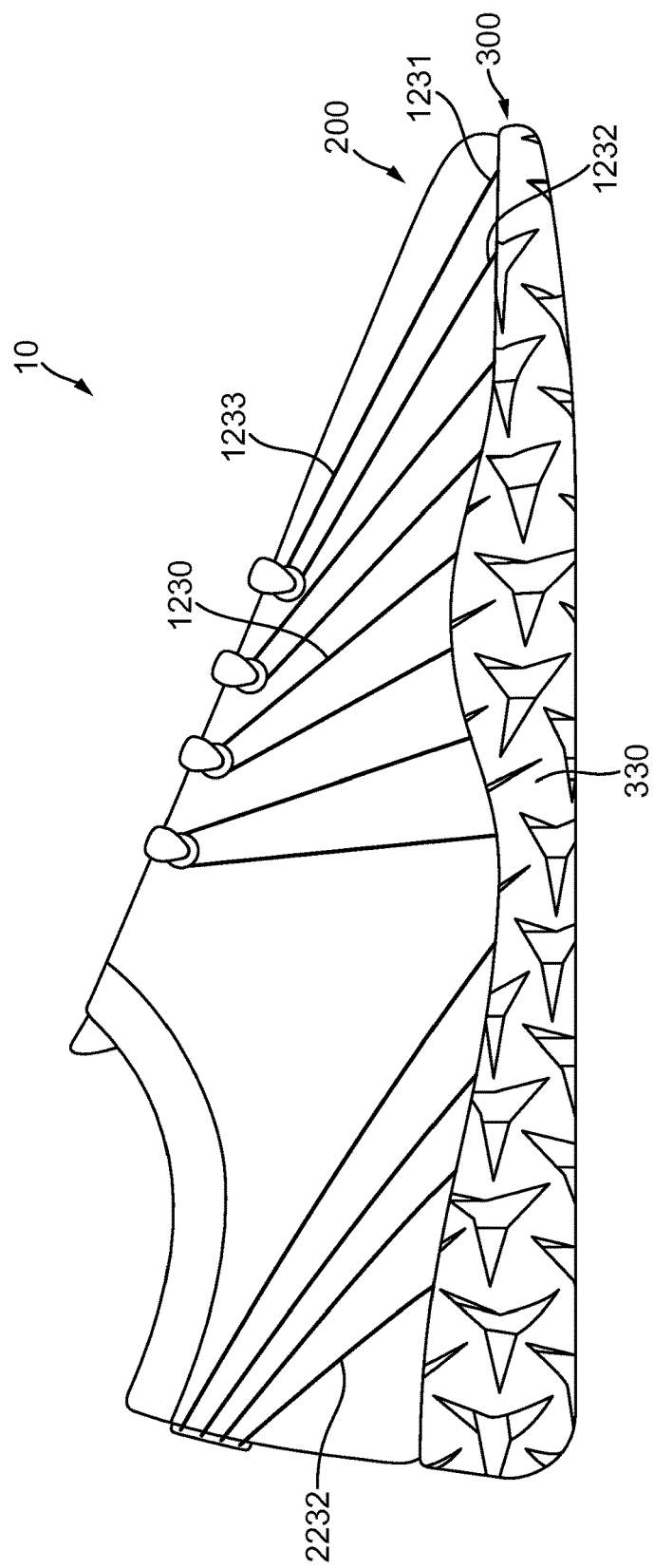
FIG. 38 is a lateral side elevational view of the article of footwear of FIG. 38.
Figure 39:
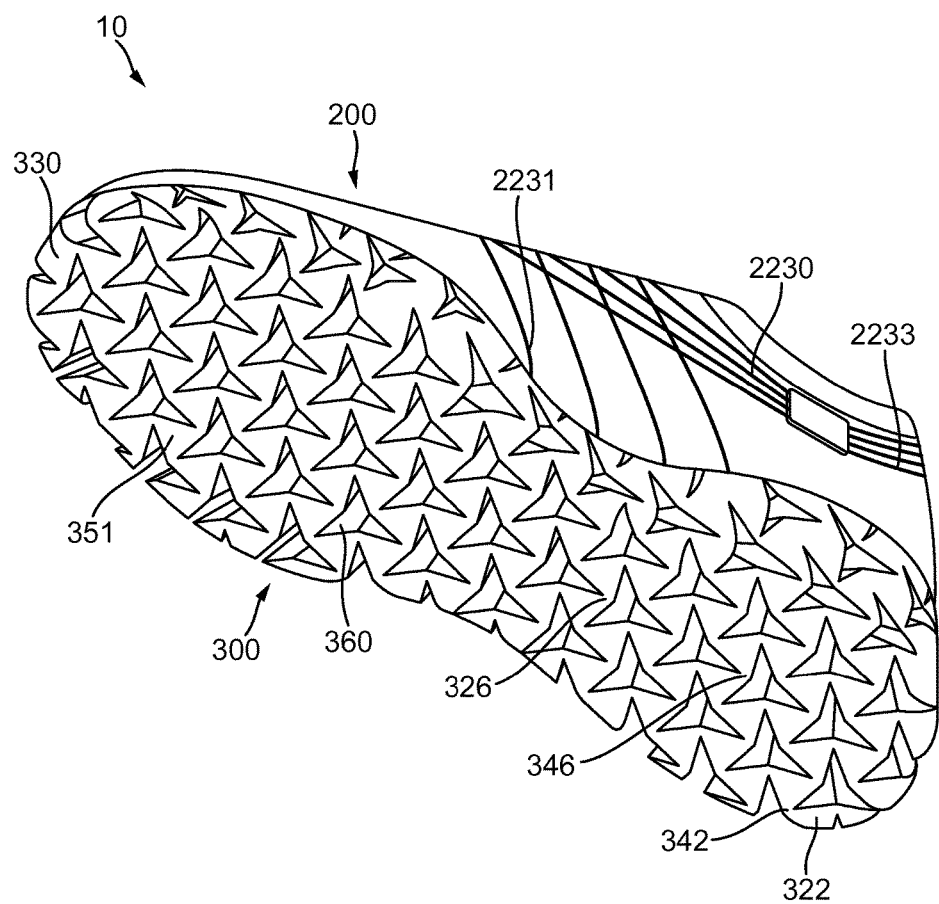
FIG. 39 is medial side bottom perspective view of the article of footwear of FIG. 38.
Figure 40:
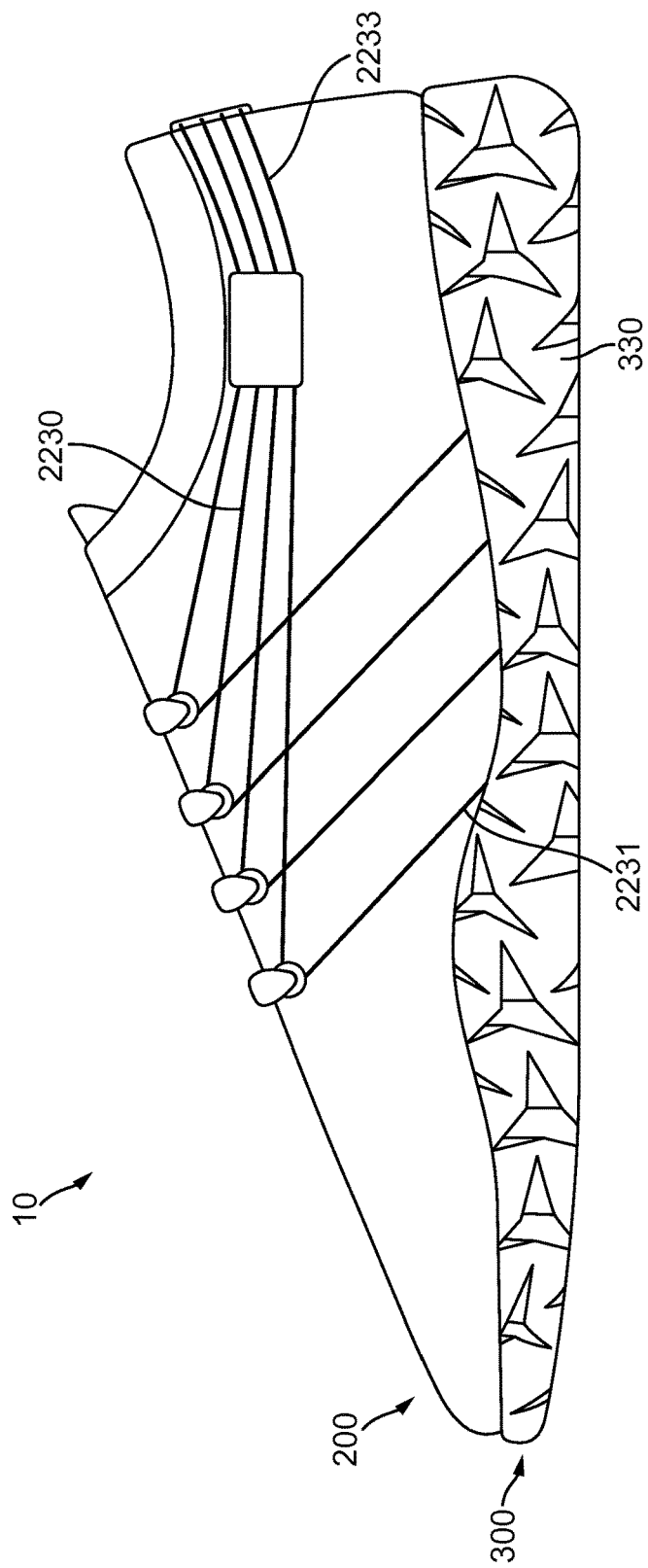
FIG. 40 is a medial side elevational view of the article of footwear of FIG. 38.
Figure 41:
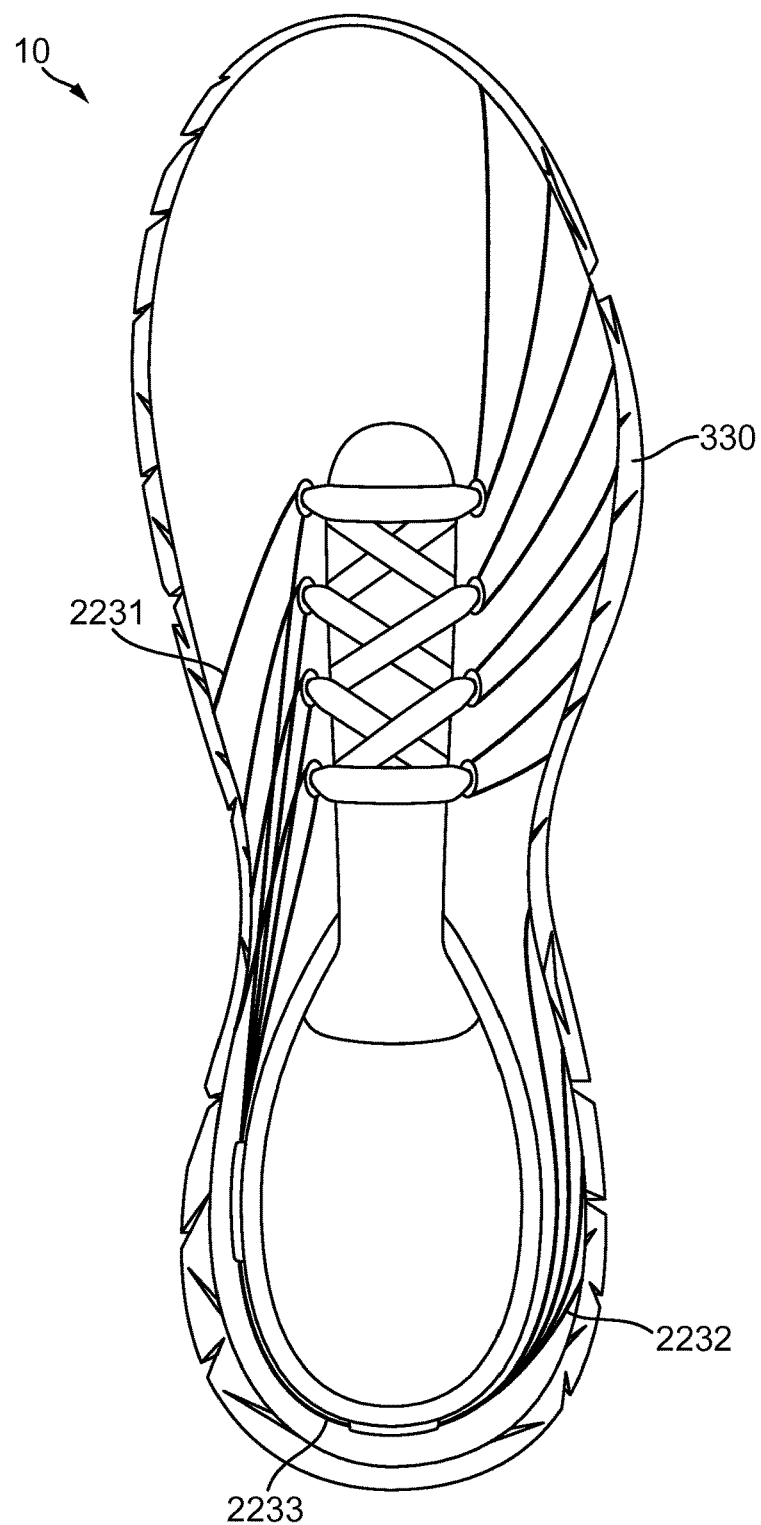
FIG. 41 is a top plan view of the article of footwear of FIG. 38.

Although FIGS. 1-8 and 9-19 depict auxetic element 330 as having an auxetic structure comprised of triangular first portions 351 joined by second portions 352 and surrounding apertures 360 with reentrant-triangle shapes, auxetic element 330 may have other auxetic structures. FIG. 36 depicts an alternate configuration of the auxetic structure of auxetic element 330, in which rectangular-shaped first portions 351 are joined by second portions 352 and surround parallelogram-shaped apertures 360. Under an applied tension (or compression), first portions 351 may rotate, paths between non-neighboring second portions 352 may become more straight (or less straight), and auxetic element 330 may exhibit an outward expansion (or inward contraction) in two orthogonal directions.

More generally, auxetic element 330 may have any of a variety of configurations including first portions 351, which may be regularly-shaped polygons or may be irregularly-shaped; second portions 352 joining first portions 351; and apertures 360, which may be regularly-shaped polygons or may be irregularly-shaped. Similarly, auxetic element 330 may have a regular geometric pattern based upon polygonal units, or may have an irregular pattern, or no pattern at all. With or without regularly shaped portions 351 and apertures 360, and with or without a regular geometric pattern, auxetic element 330 may be operable to expand in two orthogonal directions under an applied tension in only one of the directions, and may be operable to contract in two orthogonal directions under an applied compression in only one of the directions.

Auxetic element 330 may also have any of the configurations of the auxetic sole structures disclosed in U.S. patent application Ser. No. 14/030,002, which was filed on Sep. 18, 2013 and entitled "Auxetic Structures And Footwear With Soles Having Auxetic Structures," such prior U.S. Patent Application being entirely incorporated herein by reference.

FIGS. 37-41 depict another configuration of footwear 10. In this configuration, sole structure 300 wraps upward around lower side portions of base layer 210. Some of first portions 351, second portions 352, and apertures 360 form part of a side surface of footwear 10, and are accordingly exposed to an exterior of footwear 10 even when footwear 10 is resting on the ground. This alternate configuration of sole structure 300 may advantageously assist sole structure 300 in wrapping upward along the sides of footwear 10 when an auxetic expansion is induced in auxetic element 330, which may in turn increase the ability of footwear 10 to dynamically adjust its fit upon a wearer's foot and keep footwear 10 better conformed to the foot of the wearer.

In the configuration of FIGS. 37-41, footwear 10 has four tensile strands 1230 with first ends 1231 positioned in forefoot region 11 of lateral side 15, middle portions 1233 extending around lace apertures 227, and second ends 1232 positioned in forefoot region 11 of lateral side 15. Footwear 10 also has four tensile strands 2230 with first ends 2231 positioned in midfoot region 12 of medial side 14, middle portions 2233 extending around heel region 13, and second ends 2232 positioned in heel region 13 of lateral side 15. Footwear 10 accordingly has at least two sets of tensile strands: a first set arranged to extend between lace apertures 227 and forefoot region 11 on lateral side 15, and a second set arranged to extend between midfoot region 12 on medial side 14 and heel region 13 on lateral side 15.

This alternate configuration of tensile strands provides an upper bound to the expansion of portions of upper 200 that extend between lace apertures 227 on lateral side 15 and auxetic element 330 in forefoot region 11 of lateral side 15. Similarly, this configuration of tensile strands also provides an upper bound to the expansion of portions of upper 200 that extend from auxetic element 330 in midfoot region 12 of medial side 14, to lace apertures 227 on medial side 14, around heel region 13, and to auxetic element 330 in heel region 13 of lateral side 15.

Footwear 10 may thus include tensile strands 1230 having first ends 1231 and second ends 1232 positioned in the same region and side of the footwear, and footwear 10 may also include tensile strands 2230 having first ends 2231 positioned on medial side 14, and second ends 2232 positioned on lateral side 15. More generally, footwear 10 in various configurations may include tensile strands 230 having first ends 231 positioned in any region and on either side of the footwear, and second ends 232 positioned in any region and on either side of the footwear.

While various embodiments have been described, the description is intended to be exemplary, rather than limiting and it will be apparent to those of ordinary skill in the art that many more embodiments and implementations are possible that are within the scope of the embodiments. Accordingly, the embodiments are not to be restricted except in light of the attached claims and their equivalents. Also, various modifications and changes may be made within the scope of the attached claims.

What is claimed is:

1. An article of footwear comprising: an upper and a sole structure, the sole structure comprising:
   an upper surface and an opposing ground-contacting surface, the upper abutting and coupled with the upper surface;
   a plurality of apertures extending from at least one of the upper surface or the ground-contacting surface, the sole structure further including a plurality of sole portions disposed between adjacent ones of the plurality of apertures, wherein the arrangement of the plurality of sole portions and the plurality of apertures forms an auxetic structure; and the upper comprising:
   a base layer and a tensile strand, the tensile strand having a first end and a second end, a portion of the tensile strand between the first end and the second end being separate from the material of the base layer and lying adjacent to a surface of the base layer; and
   wherein the first end of the tensile strand has a fixed position relative to a peripheral region of the sole structure: and
   wherein a tension applied through the tensile strand induces an auxetic deformation of the sole structure such that each of the plurality of apertures expands simultaneously in both the radial and longitudinal directions.

2. The article of footwear of claim 1, wherein the base layer exhibits a first degree of expansion under the applied tension, and the first end of the tensile strand exhibits a second degree of expansion under the applied tension, and wherein the first degree of expansion is greater than the second degree of expansion.

3. The article of footwear of claim 1. wherein the first end of the tensile strand is secured to the peripheral region of the sole structure.

4. The article of footwear of claim 1, wherein the second end of the tensile strand is secured to a middle region of the base layer.

5. The article of footwear of claim 1, wherein the second end of the tensile strand is secured to a lace aperture region of the base layer.

6. The article of footwear of claim 1, wherein the first end of the tensile strand is secured to the peripheral region of the sole structure at a first location, and the second end of the tensile strand is secured to the peripheral region of the sole structure at a second location.

7. The article of footwear of claim 1, wherein the base layer includes a lace aperture, and a middle portion of the tensile strand extends around the lace aperture.

8. The article of footwear of claim 1, wherein the plurality of sole portions includes a plurality of first portions and a plurality of second portions, the first portions being joined to each other by the second portions, the first portions and the second portions defining the plurality of apertures, and the first portions being operable to locally rotate relative to each other and within the sole structure in response to a tension applied across a portion of the sole structure.

9. An article of footwear comprising:
   a sole structure including:
      an upper surface and an opposing ground-contacting surface;
      a plurality of apertures extending from at least one of the upper surface or the ground-contacting surface, the sole structure further including a plurality of sole portions disposed between adjacent ones of the plurality of apertures, wherein the arrangement of the plurality of sole portions and the plurality of apertures forms an auxetic structure;
   a base layer secured to a peripheral region of the sole structure; and
   a tensile strand separate from the material of the base layer, the tensile strand having at least one end fixed in position relative to a peripheral region of the sole structures; and
   wherein a tension applied through the tensile strand induces an auxetic deformation of the sole structure such that each of the plurality of apertures expands simultaneously in both the radial and longitudinal directions.

10. The article of footwear of claim 9, wherein the tensile strand has at least one end secured to the peripheral region of the sole structure.

11. The article of footwear of claim 9, wherein the tensile strand has another end secured to one of a middle region of the base layer and a lace aperture region of the base layer.

12. The article of footwear of claim 9, wherein the tensile strand has two ends fixed in position relative to the peripheral region of the sole structure.

13. The article of footwear of claim 12, wherein the base layer includes a lace aperture, and a middle portion of the tensile strand extends around the lace aperture.

14. The article of footwear of claim 9, wherein the footwear comprises a plurality of tensile strands and the base layer has a plurality of lace apertures, each of the tensile strands extending from a peripheral region of the sole structure to an area proximal to a lace aperture.

15. The article of footwear of claim 1, wherein the auxetic deformation of the sole structure is greater at the ground-contacting surface than at the upper surface of the sole structure.

16. The article of footwear of claim 9, wherein the auxetic deformation of the sole structure is greater at the ground-contacting surface than at the upper surface of the sole structure.

* * * * *

UNITED STATES PATENT AND TRADEMARK OFFICE
CERTIFICATE OF CORRECTION

PATENT NO. : 10,064,448 B2
APPLICATION NO. : 14/470067
DATED : September 4, 2018
INVENTOR(S) : Elizabeth Langvin et al.

Page 1 of 1

It is certified that error appears in the above-identified patent and that said Letters Patent is hereby corrected as shown below:

In the Claims

In Claim 3, Line 33 "The article of footwear of claim 1." should read --The article of footwear of claim 1,--

In Claim 9, Line 41 "structures; and" should read --structure; and--

Signed and Sealed this
Fifteenth Day of January, 2019

Andrei Iancu
*Director of the United States Patent and Trademark Office*